(12) United States Patent
Hsu et al.

(10) Patent No.: US 11,841,547 B2
(45) Date of Patent: Dec. 12, 2023

(54) OPTICAL ELEMENT DRIVE MECHANISM

(71) Applicant: TDK TAIWAN CORP., Taoyuan (TW)

(72) Inventors: Shang-Yu Hsu, Taoyuan (CN);
Meng-Ting Lin, Taoyuan (CN);
Shih-Wei Hung, Taoyuan (CN);
Yu-Huai Liao, Taoyuan (CN);
Chia-Che Wu, Taoyuan (CN);
Mao-Gen Jian, Taoyuan (CN);
Chih-Wei Weng, Taoyuan (CN)

(73) Assignee: TDK TAIWAN CORP., Taoyuan (TW)

( * ) Notice: Subject to any disclaimer, the term of this patent is extended or adjusted under 35 U.S.C. 154(b) by 343 days.

(21) Appl. No.: 17/094,697

(22) Filed: Nov. 10, 2020

(65) Prior Publication Data
US 2021/0278623 A1 Sep. 9, 2021

Related U.S. Application Data

(60) Provisional application No. 62/986,039, filed on Mar. 6, 2020.

(30) Foreign Application Priority Data

Oct. 9, 2020 (CN) .......................... 202022235080.2

(51) Int. Cl.
| | | |
|---|---|---|
| G02B 7/18 | (2021.01) | |
| G02B 7/02 | (2021.01) | |
| G02B 7/09 | (2021.01) | |
| G02B 7/08 | (2021.01) | |
| G02B 7/182 | (2021.01) | |

(52) U.S. Cl.
CPC ........... *G02B 7/1805* (2013.01); *G02B 7/023* (2013.01); *G02B 7/026* (2013.01); *G02B 7/08* (2013.01); *G02B 7/09* (2013.01); *G02B 7/1828* (2013.01); *G02B 7/1821* (2013.01)

(58) Field of Classification Search
CPC .... G02B 7/1828; G02B 7/1821; G02B 7/023; G02B 7/08; G02B 7/09; G02B 7/1805; G02B 7/025; G11B 7/093; H04N 5/2254
USPC ........................................................ 359/824
See application file for complete search history.

(56) References Cited

U.S. PATENT DOCUMENTS

| | | | | |
|---|---|---|---|---|
| 4,570,249 A | * | 2/1986 | Malissin ................ | G11B 7/093 369/111 |
| 4,752,117 A | * | 6/1988 | Ichikawa ............... | G11B 7/093 |
| 5,073,882 A | * | 12/1991 | Sasaki .................. | G11B 7/0933 369/44.14 |
| 5,177,640 A | * | 1/1993 | Grassens ................ | G11B 7/093 |
| 8,564,896 B2 | * | 10/2013 | Pang .................... | H04N 5/2254 359/822 |
| 8,670,195 B2 | * | 3/2014 | Ikushima ............. | G02B 27/646 359/814 |

(Continued)

*Primary Examiner* — Zachary W Wilkes
(74) *Attorney, Agent, or Firm* — Muncy, Geissler, Olds & Lowe, P.C.

(57) ABSTRACT

An optical element drive mechanism is provided. The optical element drive mechanism includes an immovable part, a movable part, and a drive assembly. The movable part is movable relative to the immovable part. The movable part holds an optical element with an optical axis. The drive assembly drives the movable part to move relative to the immovable part. At least part of the drive assembly is disposed on the immovable part.

20 Claims, 28 Drawing Sheets

(56) References Cited

U.S. PATENT DOCUMENTS

| | | | | |
|---|---|---|---|---|
| 9,304,325 | B2* | 4/2016 | Hu | G02B 7/09 |
| 9,769,389 | B2* | 9/2017 | Miller | G03B 19/22 |
| 10,101,595 | B2* | 10/2018 | Hu | G02B 27/646 |
| 10,334,146 | B2* | 6/2019 | Im | G02B 15/14 |
| 10,382,698 | B2* | 8/2019 | Sharma | H04N 5/2254 |
| 10,638,032 | B2* | 4/2020 | Lau | G02B 27/646 |
| 10,715,707 | B2* | 7/2020 | Lin | G02B 7/09 |
| 10,887,498 | B2* | 1/2021 | Hu | H04N 5/2253 |
| 10,890,734 | B1* | 1/2021 | Sharma | H04N 5/23212 |
| 10,969,652 | B2* | 4/2021 | Miller | G03B 13/36 |
| 11,159,727 | B2* | 10/2021 | Lee | G03B 30/00 |
| 11,190,085 | B2* | 11/2021 | Kuo | G03B 3/10 |
| 11,245,827 | B2* | 2/2022 | Park | G03B 3/10 |
| 11,262,527 | B2* | 3/2022 | Yang | G02B 27/0068 |
| 11,322,628 | B2* | 5/2022 | Wu | H01L 31/02002 |
| 11,372,195 | B2* | 6/2022 | Xu | G02B 27/646 |
| 11,493,741 | B2* | 11/2022 | Kwon | G03B 3/10 |
| 2018/0017844 | A1* | 1/2018 | Yu | G02B 7/04 |
| 2018/0164661 | A1* | 6/2018 | Sekimoto | G03B 5/06 |
| 2018/0239162 | A1* | 8/2018 | Lee | H04N 5/2328 |
| 2019/0212632 | A1* | 7/2019 | Miller | H04N 23/57 |
| 2021/0063684 | A1* | 3/2021 | Chen | G02B 7/1805 |
| 2021/0072530 | A1* | 3/2021 | Tsai | G02B 7/08 |
| 2021/0132327 | A1* | 5/2021 | Sharma | H04N 5/2254 |
| 2021/0397017 | A1* | 12/2021 | Jeong | G03B 17/17 |
| 2022/0086351 | A1* | 3/2022 | Oh | G02B 7/021 |

* cited by examiner

OPTICAL ELEMENT DRIVE MECHANISM

CROSS-REFERENCE TO RELATED APPLICATIONS

The present application claims priority of U.S. Provisional Patent Application No. 62/986,039, filed on Mar. 6, 2020 and China Patent Application No. 202022235080.2 filed on Oct. 9, 2020, the entirety of which is incorporated by reference herein.

BACKGROUND OF THE DISCLOSURE

Field of the Disclosure

The present disclosure relates to a drive mechanism, and more particularly to an optical element drive mechanism.

Description of the Related Art

As a result of technological developments, many electronic devices (such as tablet computers and smartphones) are equipped with optical elements, optical element drive mechanisms, and light-detection elements, and thus are able to capture images and record video. Optical elements may be divided into two types: wide-angle lenses with a short focal length, and long-focus lenses with a long focal length. The wide-angle lenses and the long-focus lenses have different functions. For example, if the focal length of a lens is shorter, more scenes may be included in the images or video. To satisfy different aspects of the quality of the images or the video (such as shooting range, depth of field, and the like), the electronic device may be provided with optical elements with different focal lengths.

Additionally, when a customer is looking for an electronic device, the appearance and functionality of capturing images and video are both important. The customer tends to choose thin electronic devices with good functionality of capturing images and video. Therefore, a periscope optical mechanism has been developed. The direction of the optical path is changed so that miniaturization of the electronic device may still be achieved while multiple optical elements are placed in the optical mechanism.

When a user uses an electronic device, a shock or vibration may occur, which can cause the image or video to come out blurry. As described above, periscope mechanisms that are able to correct the displacement and compensate for displacement are required.

BRIEF SUMMARY OF THE DISCLOSURE

According to some embodiments of the disclosure, an optical element drive mechanism is provided. The optical element drive mechanism includes an immovable part, a movable part, and a drive assembly. The movable part is movable relative to the immovable part. The movable part holds an optical element with an optical axis. The drive assembly drives the movable part to move relative to the immovable part. At least part of the drive assembly is disposed on the immovable part.

In some embodiments, the drive assembly includes a circuit unit and a drive magnetic unit, the circuit unit includes a first coil and a second coil, the drive magnetic unit includes a first drive magnetic element. The first coil corresponds to an upper surface of the first drive magnetic element. The second coil corresponds to a side surface of the first drive magnetic element. In some embodiments, the winding axis of the first coil is not parallel with the winding axis of the second coil. In some embodiments, the winding axis of the first coil is perpendicular to the winding axis of the second coil. In some embodiments, the maximum size of the first coil in a direction that is parallel with the optical axis is different from the maximum size of the second coil in a direction that is parallel with the optical axis. In some embodiments, the maximum size of the first coil in a direction that is parallel with the optical axis is greater than the maximum size of the second coil in a direction that is parallel with the optical axis. In some embodiments, the upper surface of the first drive magnetic element and the side surface of the first drive magnetic element are parallel with the optical axis. The upper surface of the first drive magnetic element is not parallel with the side surface of the first drive magnetic element. In some embodiments, the drive magnetic unit further includes a second drive magnetic element, the second coil corresponds to a side surface of the second drive magnetic element, and the side surface of the first drive magnetic element is parallel with the side surface of the second drive magnetic element.

In some embodiments, the optical element drive mechanism further includes an adhesion element. The movable part includes a movable frame receiving at least part of the drive magnetic unit. The adhesion element is in direct contact with the first drive magnetic element, the second drive magnetic element, and the movable frame. In some embodiments, the movable part includes a first recession facing the second drive magnetic element and receiving at least part of the adhesion element. In some embodiments, the movable part further includes a second recession receiving at least part of the adhesion element, the adhesion element in the second recession is in direct contact with the first drive magnetic element and the movable frame, and the second recession includes an outflow-proof structure to prevent the adhesion element from an outflow.

In some embodiments, the arrangement direction of magnetic poles of the first drive magnetic element is parallel with the first direction. The first drive magnetic element and the second drive magnetic element are arranged in a second direction. The optical axis, the first direction, and the second direction are not parallel with each other. The first direction is perpendicular to the second direction. The maximum size of the first drive magnetic element in the first direction is different from the maximum size of the second drive magnetic element in the first direction. In some embodiments, the arrangement direction of magnetic poles of the second drive magnetic element is parallel with the first direction.

In some embodiments, the coil unit further includes a third coil, the drive magnetic unit further includes a third drive magnetic element, the third coil corresponds to the third drive magnetic element, and the first drive magnetic element, the second drive magnetic element, and the third drive magnetic element at least partially overlap each other when viewed from the second direction. In some embodiments, the first coil, the second coil, and the third coil are bar-like. The major axis of the first coil is parallel with the major axis of the second coil. The major axis of the first coil is not parallel with the major axis of the third coil. In some embodiments, the winding axis of the first coil is parallel with the winding axis of the third coil. In some embodiments, the first coil, the second coil, and the third coil at least partially overlap each other when viewed from the second direction.

In some embodiments, the arrangement direction of the magnetic poles of the first drive magnetic element is not parallel with the arrangement direction of magnetic poles of the third drive magnetic element. The arrangement direction of the magnetic poles of the first drive magnetic element is perpendicular to the arrangement direction of the magnetic poles of the third drive magnetic element. In some embodiments, the maximum size of the first drive magnetic element in a direction that is parallel with the optical axis is different from a maximum size of the third drive magnetic element in a direction that is parallel with the optical axis. The maximum size of the first drive magnetic element in a direction that is parallel with the optical axis is less than the maximum size of the third drive magnetic element in a direction that is parallel with the optical axis.

In some embodiments, the drive assembly further includes a magnetically-permeable element disposed between the first drive magnetic element and the third drive magnetic element, wherein the magnetically-permeable element adjusts distribution of magnetic field. In some embodiments, there is more than one third coil. The third coils correspond to the third drive magnetic element. In some embodiments, the drive assembly drives the movable part to move relative to the immovable part in the optical axis, the first direction, and the second direction.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in the figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings.

Figure 1:
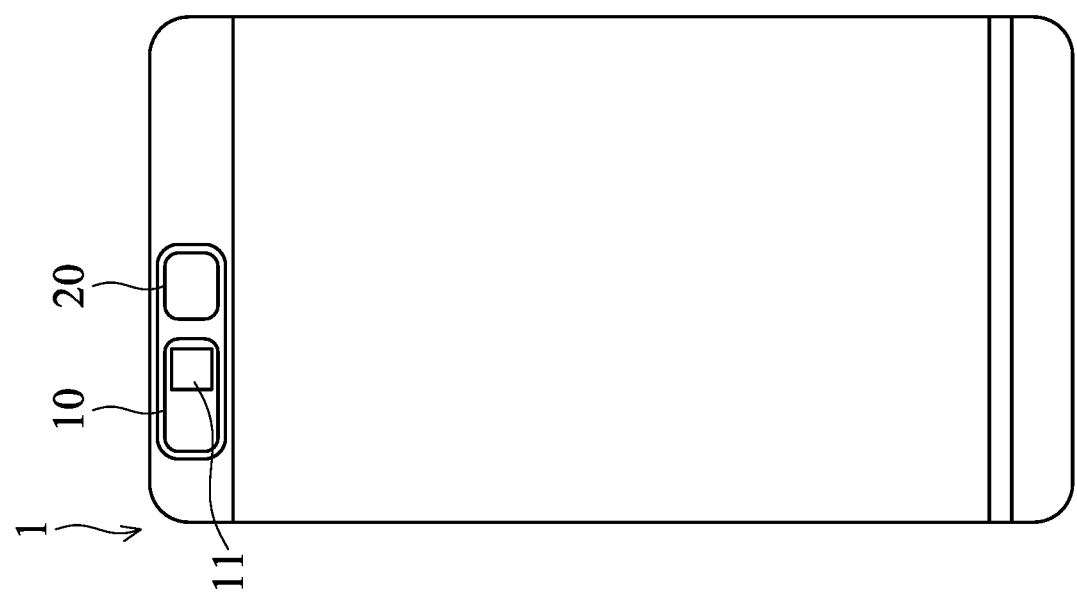
FIG. 1 is a schematic view of the electronic device equipped with the optical element drive mechanism.

FIG. 1 is a schematic view of an electronic device 1 equipped with an optical element drive mechanism 10. The electronic device 1 may be a smart phone, a tablet computer, etc. The optical element drive mechanism 10 is generally disposed on the top region of the electronic device 1. The optical element drive mechanism 10 may be a periscope mechanism. In some embodiments, the electronic device 1 may further equipped with another optical element drive mechanism 20. Images and video may be respectively generated by the optical element drive mechanism 10 and optical element drive mechanism 20 to enhance the quality of the images and video.

Figure 2:
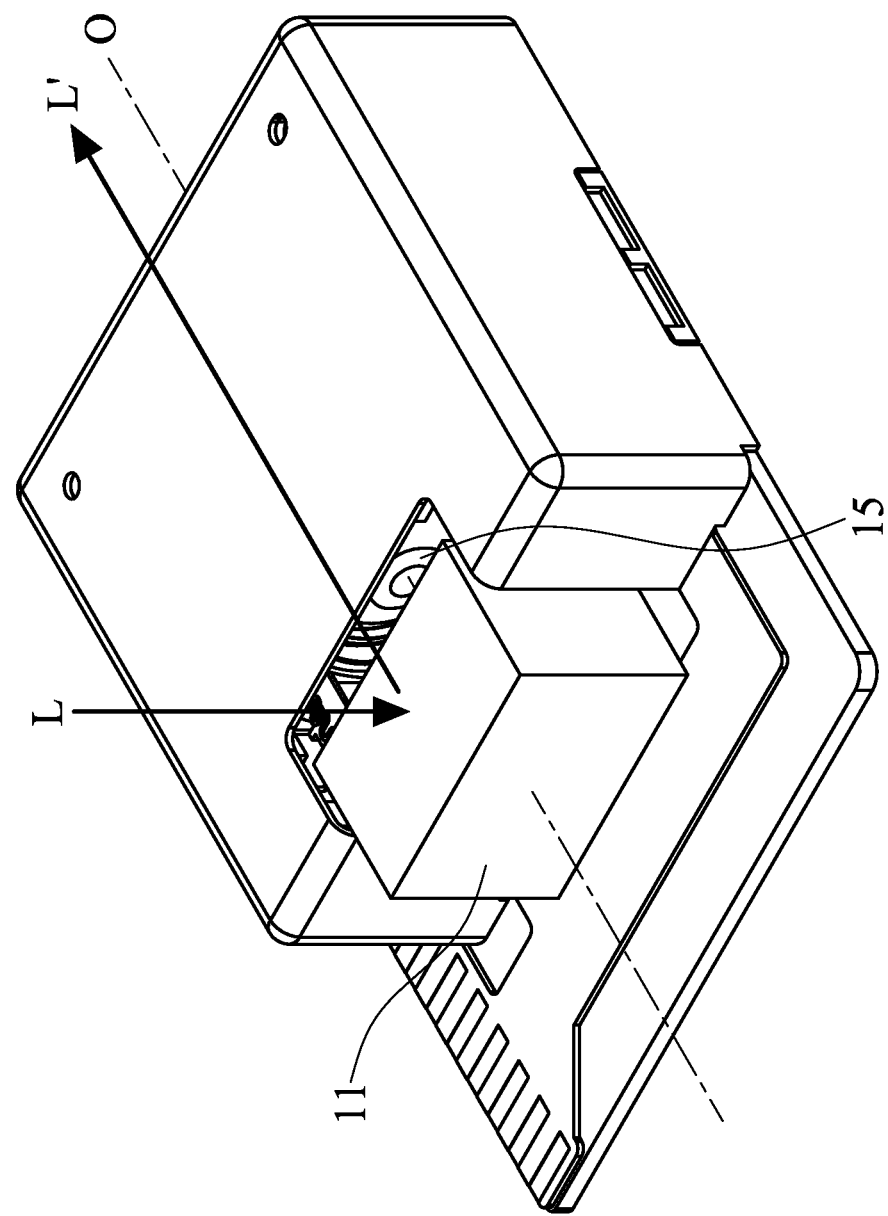
FIG. 2 is a perspective view of the optical element drive mechanism including the optical path adjustment assembly.
Figure 3:
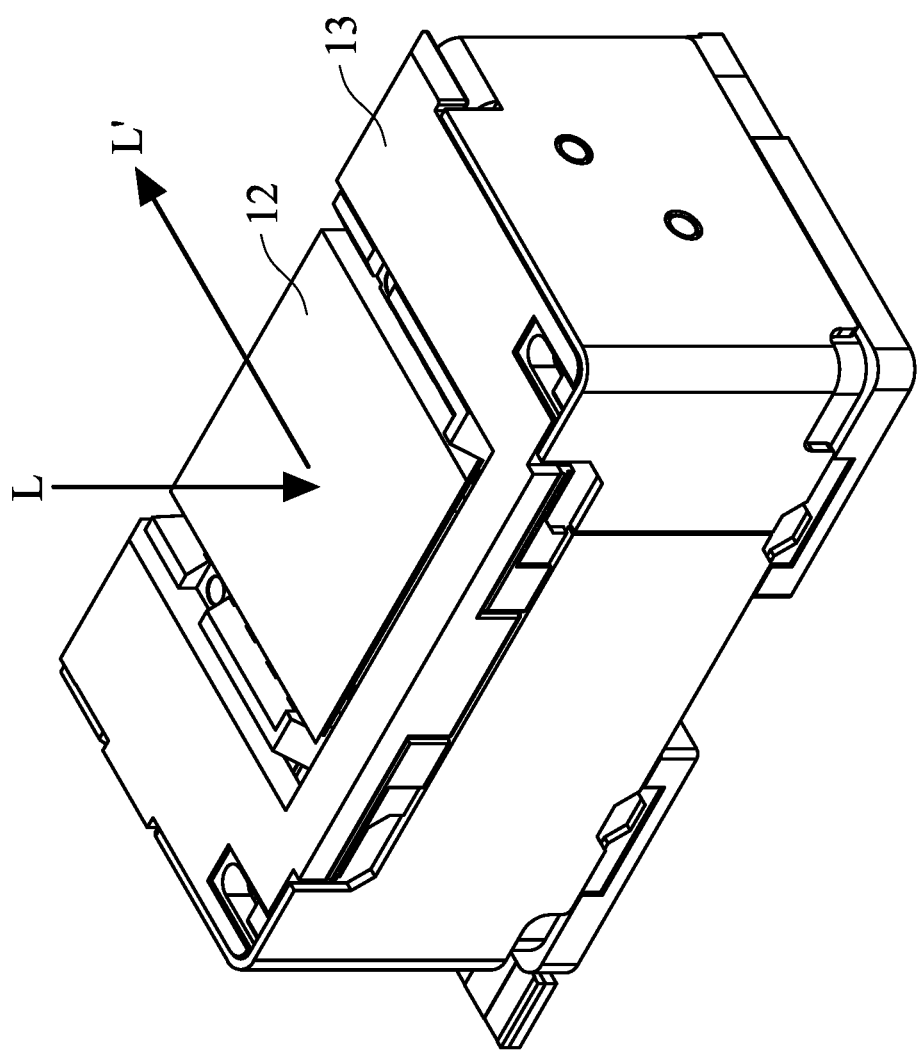
FIG. 3 is a schematic view of the optical path adjustment assembly.

FIG. 2 is a perspective view of the optical element drive mechanism 10 including an optical path adjustment assembly 11. FIG. 3 is a schematic view of the optical path adjustment assembly 11. The optical element drive mechanism 10 may include the optical path adjustment assembly 11. The optical path adjustment assembly 11 may change the optical path of an incident light L. In particular, after the optical path of the incident light L is changed by the optical path adjustment assembly 11, the incident light L enters an optical element 15 with an optical axis O. The optical axis O is an imaginary axis passing through the center of the optical element 15. The optical path adjustment assembly 11 includes an optical path adjustment element 12 and an optical path adjustment element base 13. The optical path adjustment element 12 is disposed on the optical path adjustment element base 13. The optical path adjustment element 12 may be a mirror, a prism, a beam splitter, and the like. As shown in FIG. 2, when the incident light L enters the optical path adjustment assembly 11, the incident light L is substantially perpendicular to the optical axis O. The optical path of the incident light L may be changed by rotation or movement of the optical path adjustment element 12. The incident light L becomes an exit light L' after entering the optical element 15. The exit light L' is substantially parallel with the optical axis O.

Figure 4:
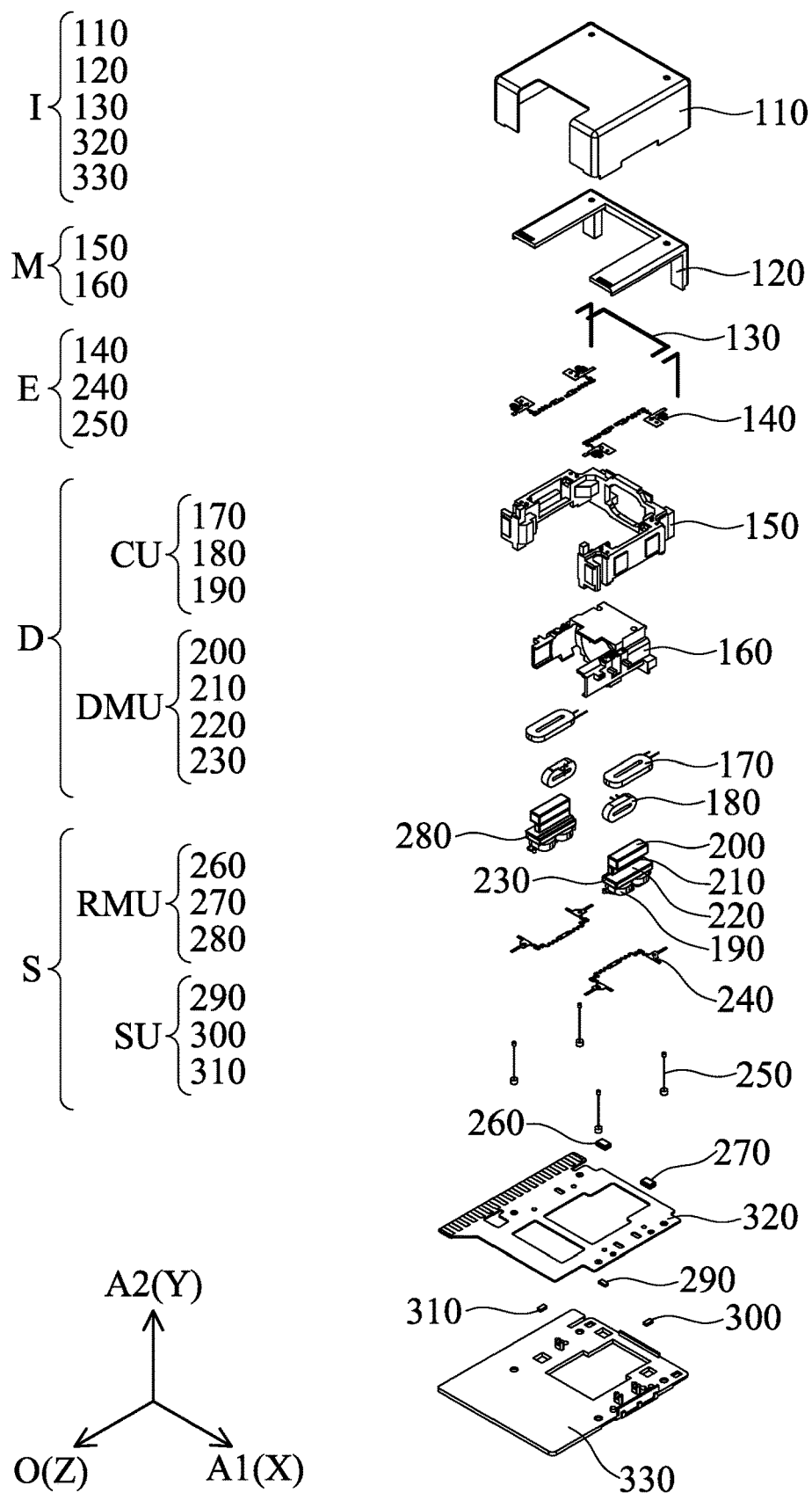
FIG. 4 is an exploded view of the optical element drive mechanism with the optical path adjustment assembly omitted.

FIG. 4 is an exploded view of the optical element drive mechanism 10 with the optical path adjustment assembly 11 omitted. The optical element drive mechanism 10 includes an immovable part I, a movable part M, an elastic assembly E, a drive assembly D, and a position sensing assembly S. The movable part M holds the optical element 15. The movable part M is movable relative to the immovable part I. The drive assembly D drives the movable part M to move relative to the immovable part I. The position sensing assembly S senses the movement of the movable part M relative to the immovable part I.

For clarity of illustration, in the drawings and in the following, a first direction A1 (the X-axis), a second direction A2 (the Y-axis), and the optical axis O (the Z-axis) may be used for describing the direction or the orientation. The first direction A1, the second direction A2, and the optical axis O are different and are not parallel with each other. In some embodiments, the first direction A1, the second direction A2, and the optical axis O are substantially perpendicular to each other.

In this embodiment, the immovable part I includes a case 110, an immovable frame 120, an embedded circuit 130, a circuit assembly 320, and a bottom 330. The movable part M includes a movable frame 150 and a holder 160. The elastic assembly E includes at least one first elastic element 140, at least one second elastic element 240, and at least one third elastic element 250. The drive assembly D includes a circuit unit CU and a drive magnetic unit DMU. The circuit unit CU includes at least one first coil 170, at least one second coil 180, and at least one third coil 190. The drive magnetic unit DMU includes at least one first drive magnetic element 200, at least one second drive magnetic element 210, at least one magnetically-permeable element 220, and at least one third drive magnetic element 230. The position sensing assembly S includes a first reference magnetic element 260, a second reference magnetic element 270, and a third reference magnetic element 280. The sensing unit SU includes a first sensing element 290, a second sensing element 300, a third sensing element 310. It should be noted that the elements may be added or omitted according to the requirements of the users. In the following, the immovable part I, the movable part M, the elastic assembly E, the drive assembly D, and the position sensing assembly S are explained in detail.

Figure 5:
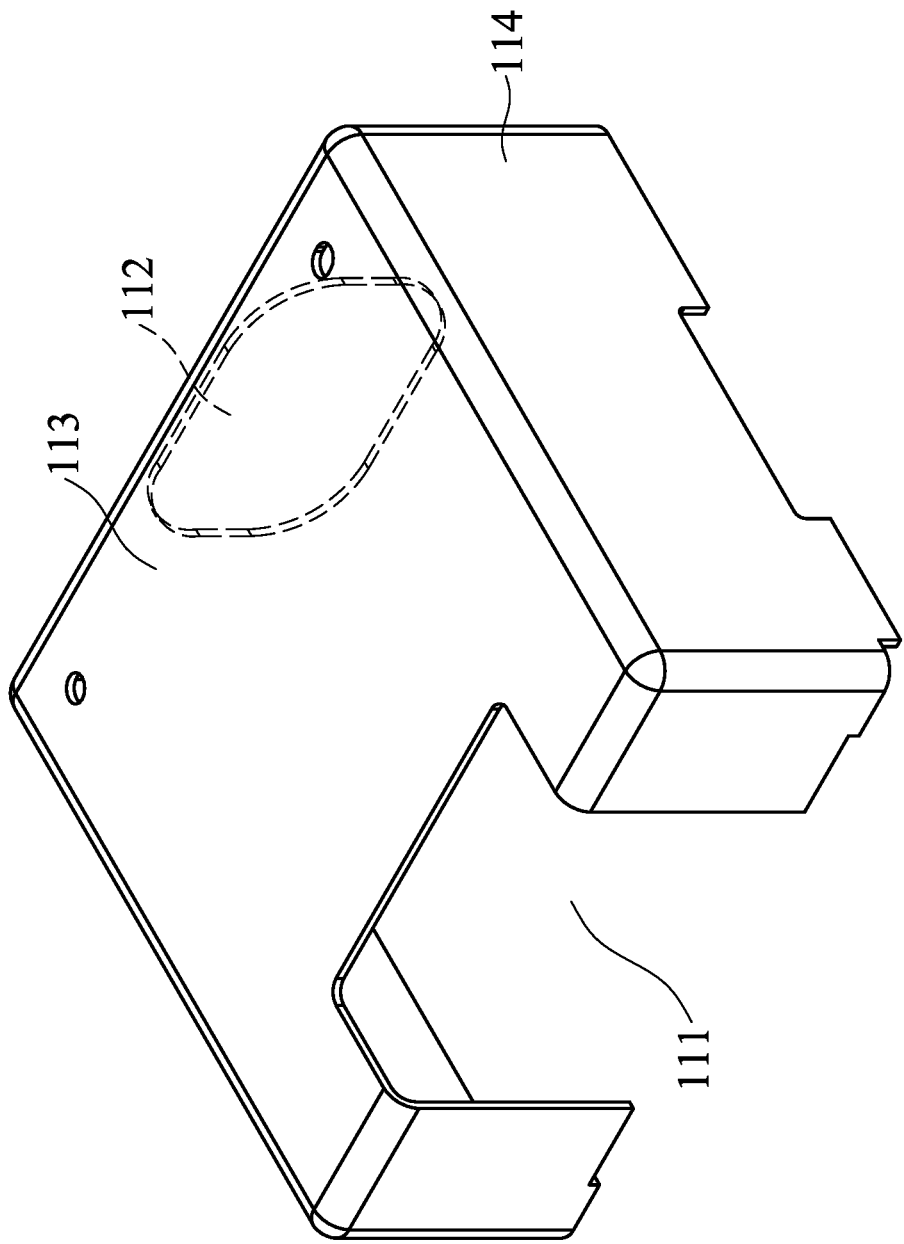
FIG. 5 is a perspective view of the case.
Figure 5:
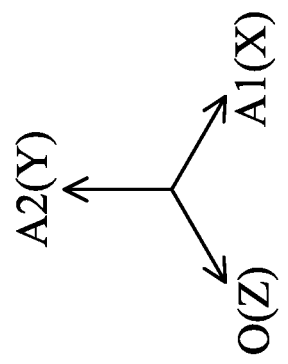
Figure 6:
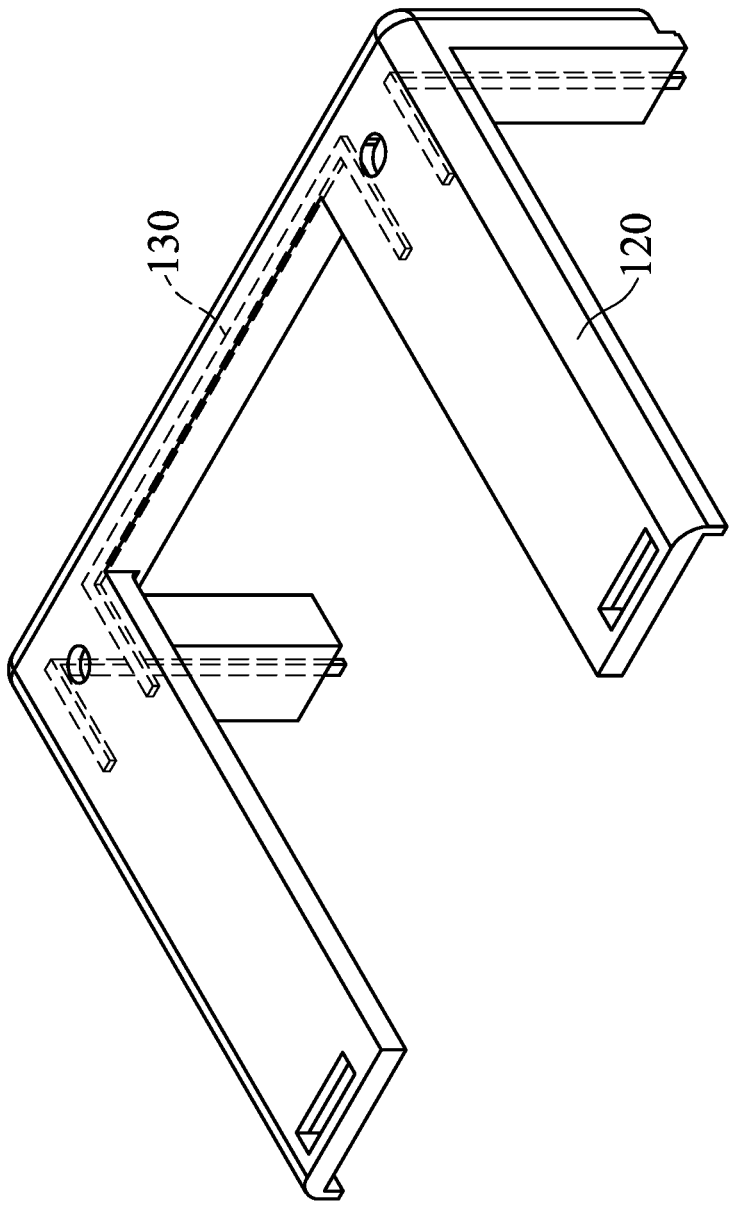
FIG. 6 is a perspective view of the immovable frame including the embedded circuit, wherein the embedded circuit is illustrated with dotted lines.
Figure 7:
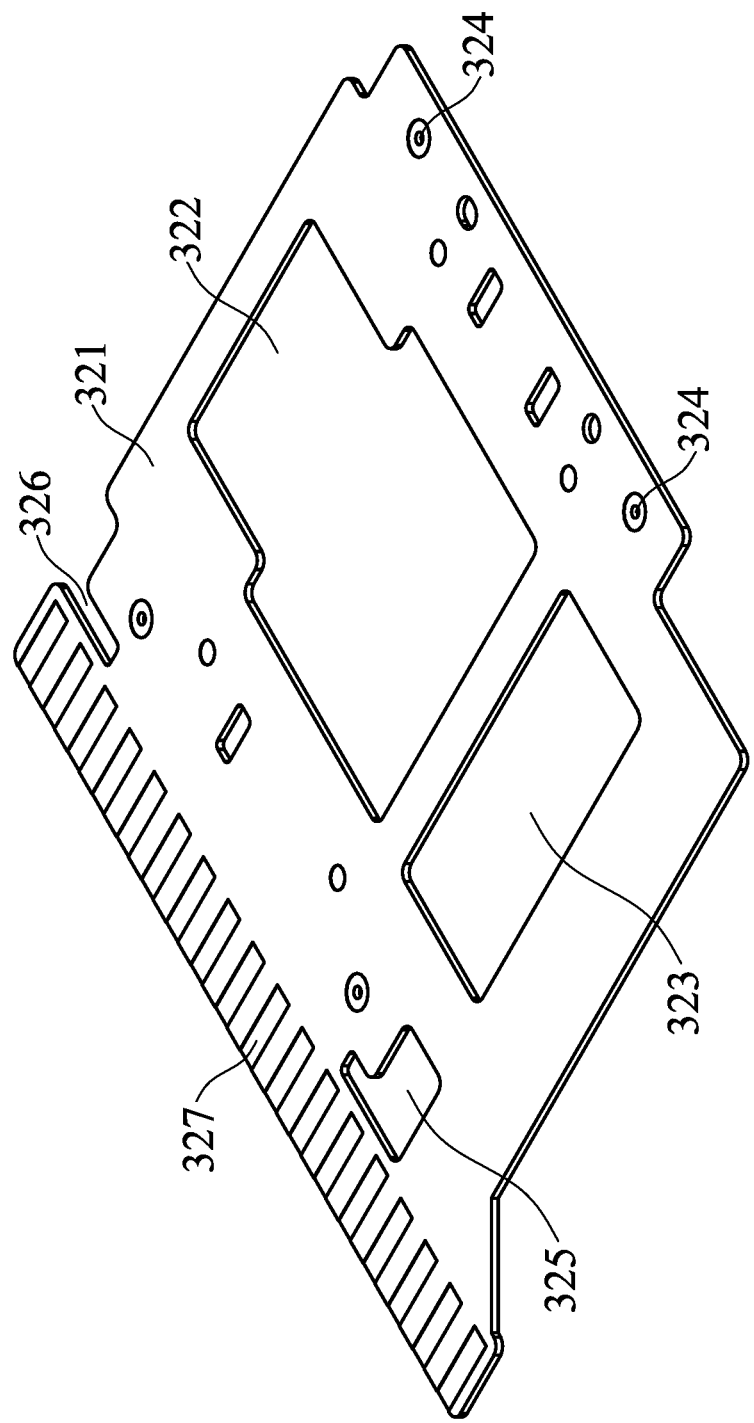
FIG. 7 is a perspective view of the circuit assembly.
Figure 8:
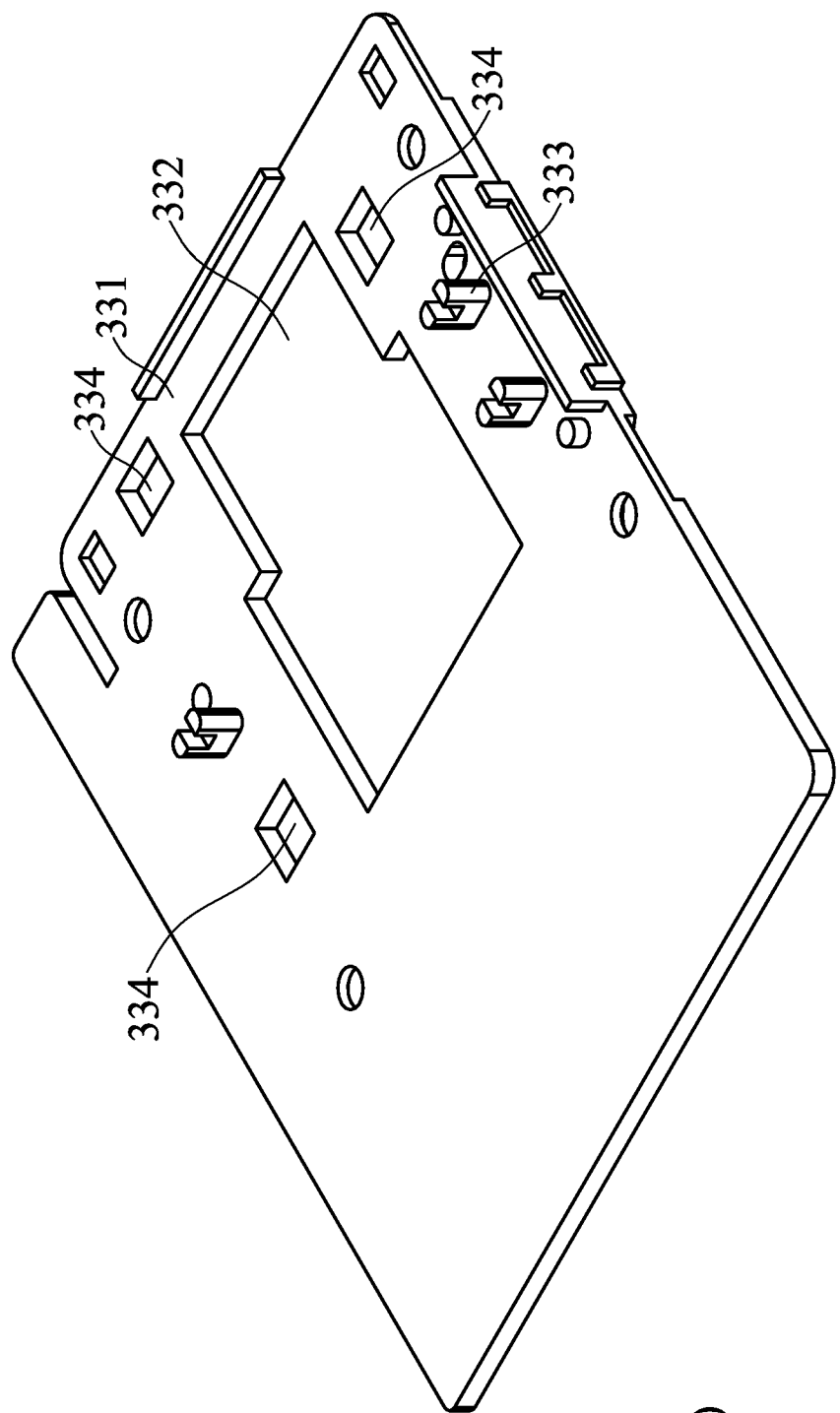
FIG. 8 is a perspective view of the bottom.
Figure 9:
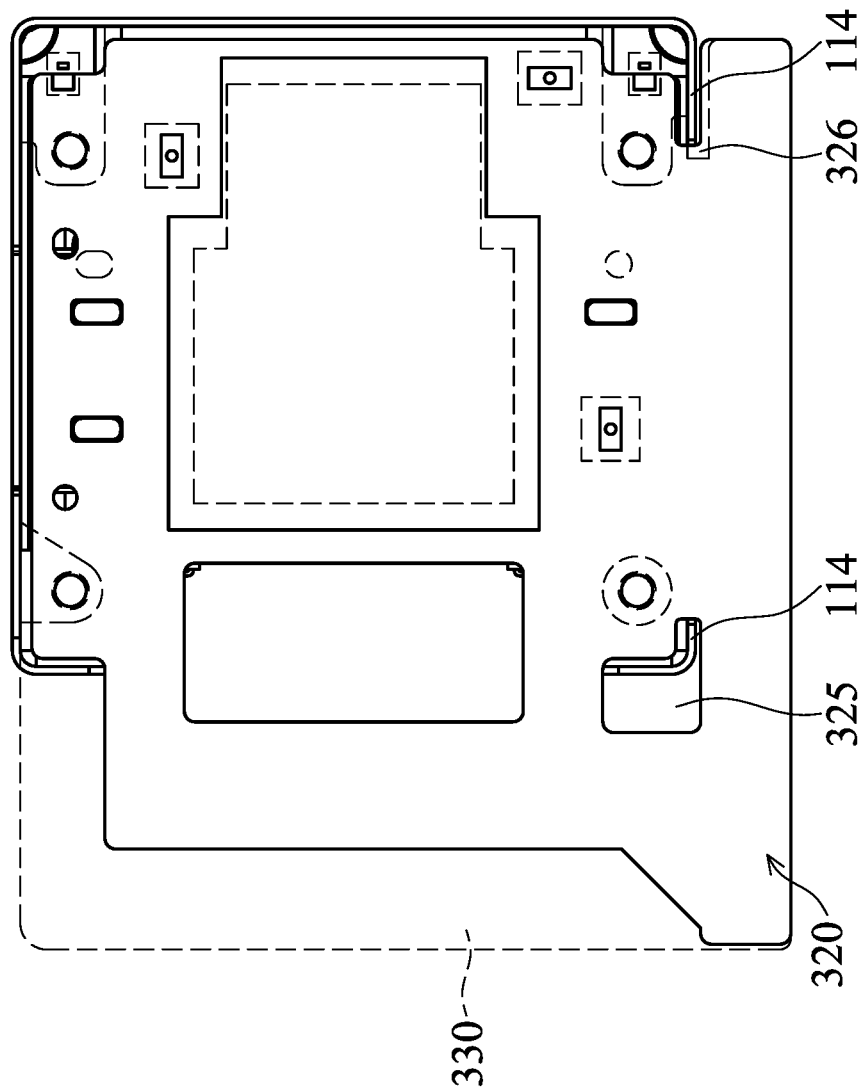
FIG. 9 is a bottom view of the optical element drive mechanism, wherein the bottom is illustrated with dotted lines.

Please refer to FIG. 5 to FIG. 9 to understand the immovable part I. FIG. 5 is a perspective view of the case 110. FIG. 6 is a perspective view of the immovable frame 120 including the embedded circuit 130, wherein the embedded circuit 130 is illustrated with dotted lines. FIG. 7 is a perspective view of the circuit assembly 320. FIG. 8 is a perspective view of the bottom 330. FIG. 9 is a bottom view of the optical element drive mechanism 10, wherein the bottom 330 is illustrated with dotted lines. The case 110, the immovable frame 120, the circuit assembly 320, and the bottom 330 of the immovable part I are arranged in the second direction A2 sequentially. The case 110 is connected to the bottom 330. After the case 110 is connected to the bottom 330, the space formed therein may accommodate the movable part M, the elastic assembly E, the drive assembly D, and the position sensing assembly S, and the like.

The case 110 may be made of a metal material. As shown in FIG. 5, the case 110 includes a light entrance 111, a light exit 112, a top wall 113, and at least one sidewall 114. The light entrance 111 is formed on one side of the case 110. The light entrance 111 may accommodate the optical path adjustment assembly 11. The incident light L may enter the optical element drive mechanism 10 via the light entrance 111. The light exit 112 is formed on the side opposite to the light entrance 111. The exit light L' may leave the optical element drive mechanism 10 via the light exit 112. The top wall 113 is perpendicular to the second direction A2 and parallel with the optical axis O. The sidewall 114 extends in the second direction A2 from the edge of the top wall 113.

The immovable frame 120 is disposed inside the case 110. In particular, the immovable frame 120 is disposed under the case 110. The immovable frame 120 may be made of a non-metal material, such as plastic or resin. Part of the embedded circuit 130 is embedded in the immovable frame 120 by methods such as insert molding. The embedded circuit 130 may be made of a conductive material such as metal. The embedded circuit 130 is used for electrical connection.

The circuit assembly 320 is disposed over the bottom 330. The circuit assembly 320 may be a circuit board such as a flexible printed circuit (FPC) or a rigid-flex board. As shown in FIG. 7, the circuit assembly 320 includes a circuit assembly body 321, a circuit assembly receiving portion 322, a circuit assembly opening 323, at least one third elastic element connection portion 324, a through hole 325, a notch 326, and an outside electrical connection portion 327. The circuit assembly body 321 is a plate structure perpendicular to the second direction A2. The circuit assembly receiving portion 322 may receive at least part of the holder 160. The circuit assembly opening 323 may receive at least part of the optical path adjustment assembly 11, including receiving the whole optical path adjustment assembly 11, only receiving part of the optical path adjustment element base 13, and the like. The third elastic element connection portion 324 is used for placing the third elastic element 250. The through hole 325 is formed adjacent to the circuit assembly opening 323 and is substantially L-shaped. The notch 326 is formed on one side of the circuit assembly 320 and is located on the side on which the light exit 12 of the case 10 is located. The notch 326 is substantially a slit. The current is supplied to the optical element drive mechanism 10 via the outside electrical connection portion 327.

As shown in FIG. 8, the bottom 330 includes a bottom body 331, a bottom receiving portion 332, at least one pillar 333, at least one recess 334. The bottom body 331 is a plate structure that is perpendicular to the second direction A2. The bottom receiving portion 332 may receive at least part of the holder 160. The pillar 333 is used for placing the third coil 190. The recess 334 is used for receiving the sensing unit SU. In particular the three recesses 334 in FIG. 8 receive the first sensing element 290, the second sensing element 300, and the third sensing element 310, respectively. In some embodiments, the depth of the recess 334 is greater than the depth of any of the first sensing element 290, the second sensing element 300, and the third sensing element 310, so that the recess 334 may effectively protect the first sensing element 290, the second sensing element 300, and the third sensing element 310.

As shown in FIG. 9, the different corners of the sidewalls 114 of the case 110 are in contact with the bottom 330 via the through hole 325 and the notch 326 of the circuit assembly 320. The shape of the notch 326 is different from that of the through hole 325.

Figure 10:
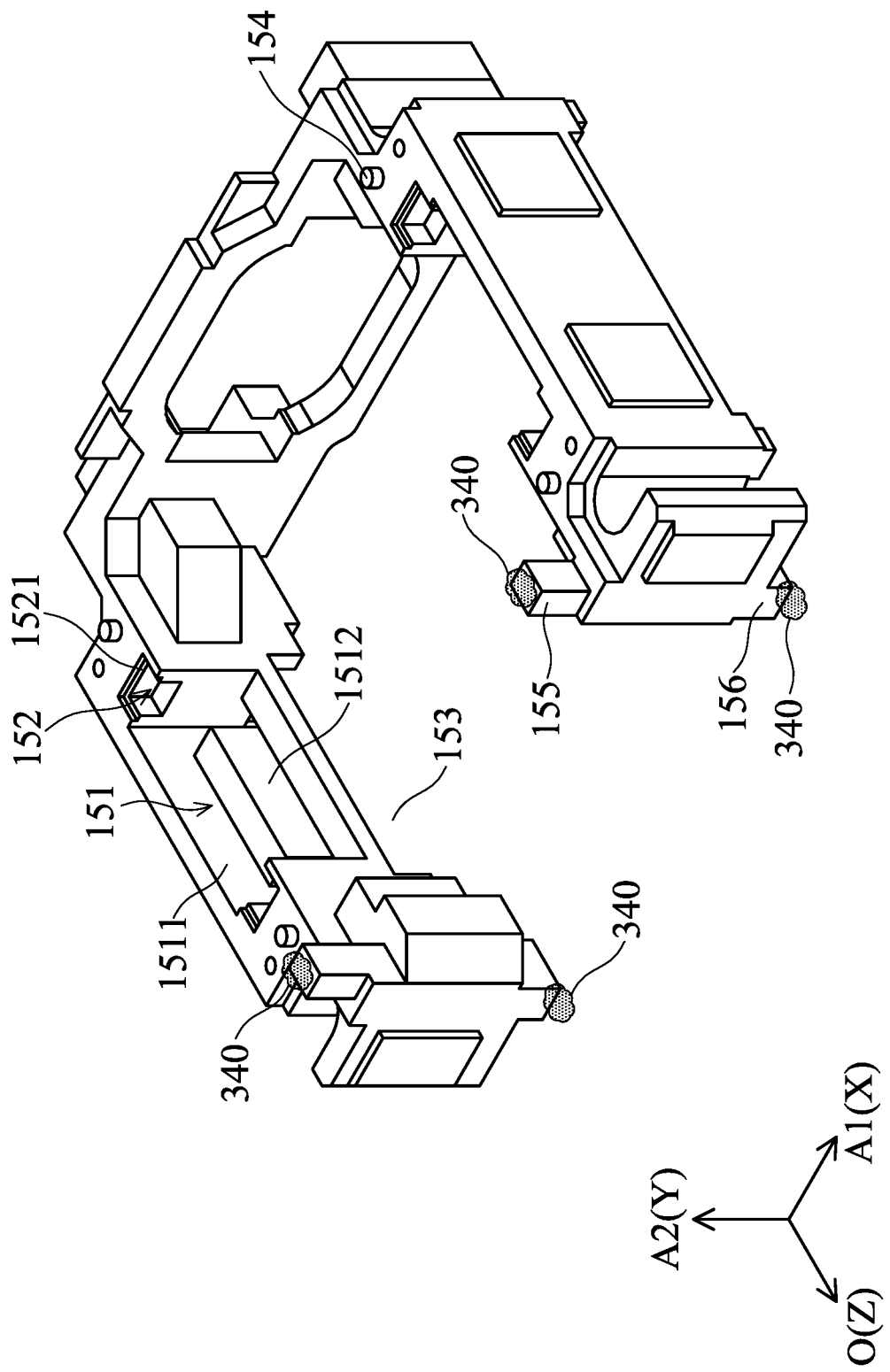
FIG. 10 is a perspective view of the movable frame.
Figure 11:
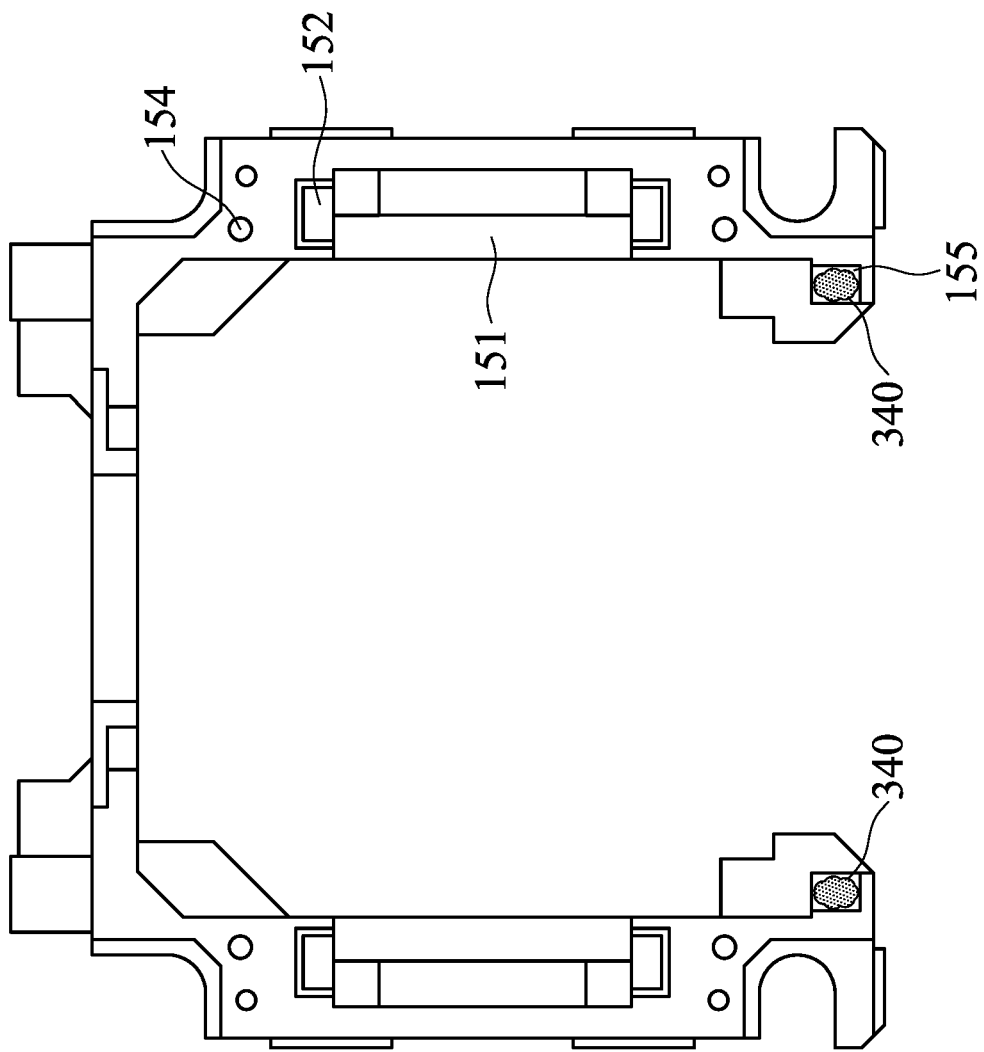
FIG. 11 is a top view of the movable frame.
Figure 12:
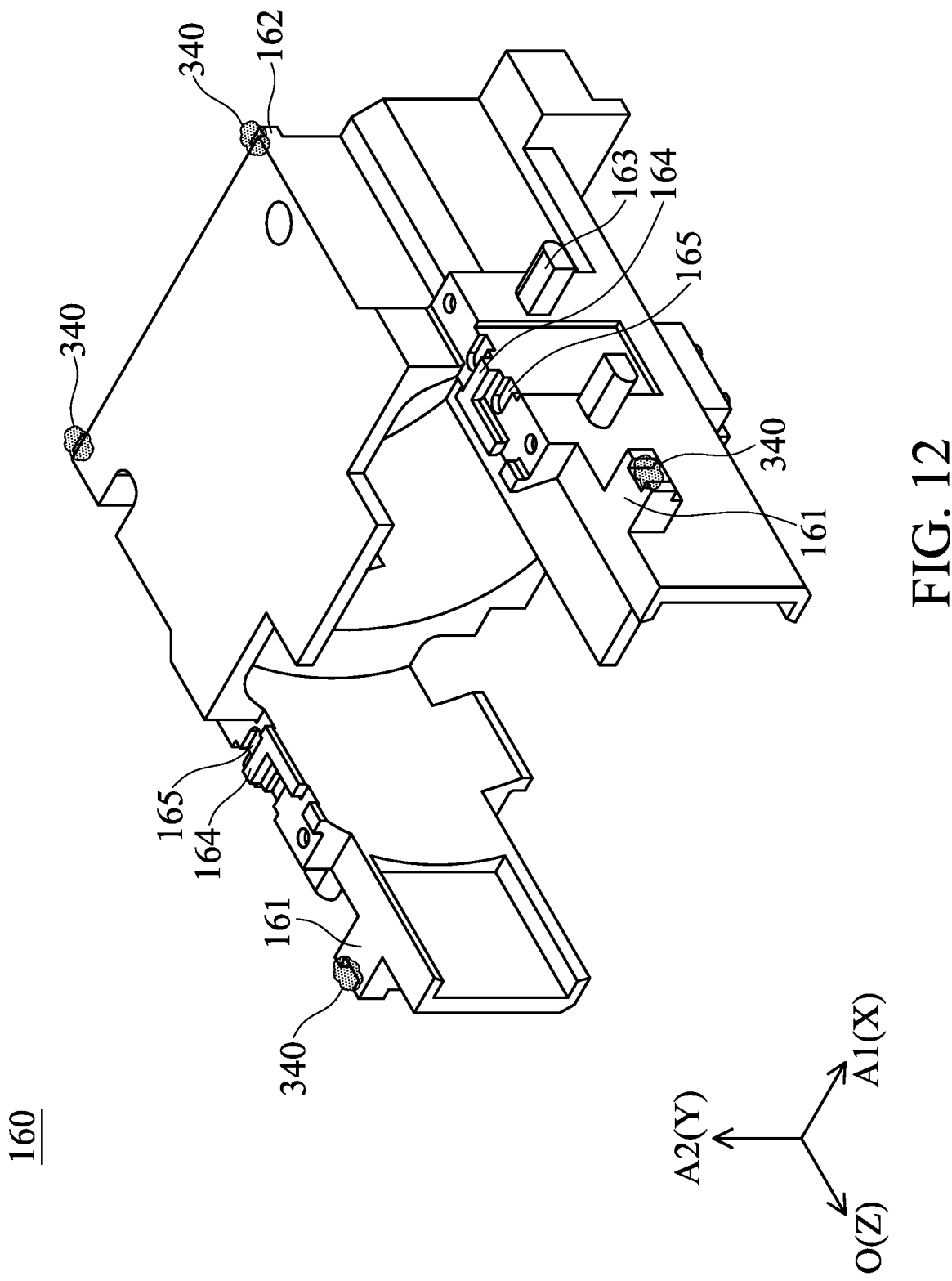
FIG. 12 is a perspective view of the holder.
Figure 13:
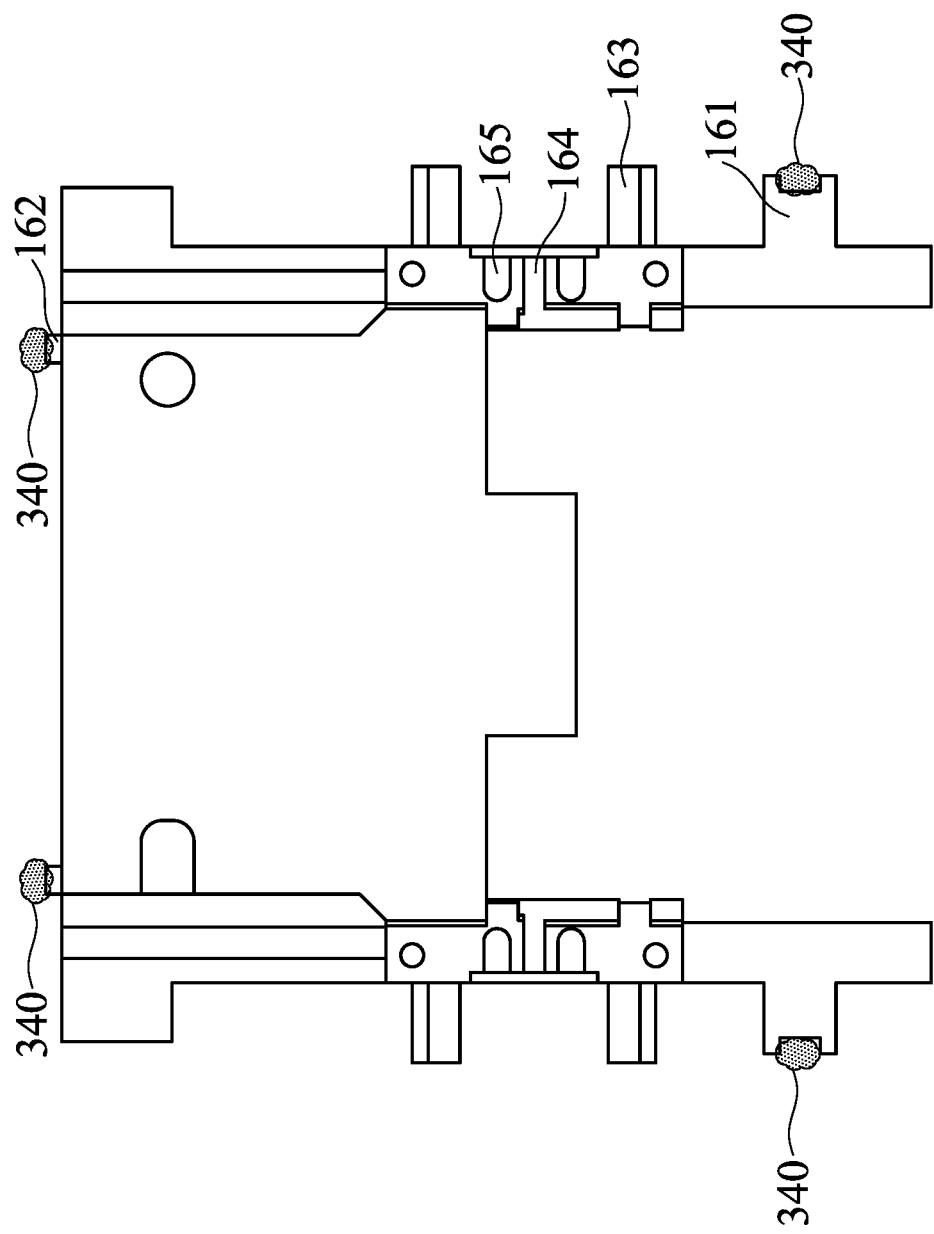
FIG. 13 is a top view of the holder.

Please also refer to FIG. 10 to FIG. 13 to understand the movable part M. FIG. 10 is a perspective view of the movable frame 150. FIG. 11 is a top view of the movable frame 150. FIG. 12 is a perspective view of the holder 160. FIG. 13 is a top view of the holder 160.

The movable frame 150 is disposed between the immovable frame 120 and the circuit assembly 320. The movable frame 150 is substantially U-shaped to surround the holder 160. As shown in FIG. 10 and FIG. 11, the movable frame 150 includes at least one first recession 151, at least one second recession 152, at least one third recession 153, at least one first elastic element connection portion 154, at least one upper stopping portion 155, and at least one lower stopping portion 156.

The first recession 151 faces the first drive magnetic element 200 and the second drive magnetic element 210. The first recession includes a first half 1511 and a second half 1512, and the size of the first half 1511 is different from that of the second half 1512. The first half 1511 of the first recession 151 may receive at least part of the first drive magnetic element 200 while the second half 1512 of the first recession 151 may receive at least part of the second drive magnetic element 210. The second recession 152 is formed on the edge of the first recession 151. The second recession 152 includes an outflow-proof structure 1521. The outflow-proof structure 1521 is substantially step-like. The third recession 153 may receive at least part of the third drive magnetic element 230. The first elastic element connection portion 154 is disposed on the top surface of the movable frame 150 for connecting to the first elastic element 140. The first elastic element connection portion 154 may be a protrusion.

The upper stopping portion 155 is the part of the movable frame 150 that is closest to the top wall 113 of the case 110. The upper stopping portion 155 extends upwardly in the second direction A2. The lower stopping portion 156 is the part of the movable frame 150 that is closest to the circuit assembly 320. The lower stopping portion 156 extends downwardly in the second direction A2. The upper stopping portion 155 and the lower stopping portion 156 may restrict the range of movement of the movable frame 150 in the second direction A2. When the movable frame 150 moves upwardly in the second direction A2 and reaches the limit, the upper stopping portion 155 is in contact with the top wall 113 of the case 110, and thus the movable frame 150 cannot keep moving upwardly. When the movable frame 150 moves downwardly in the second direction A2 and reaches the limit, the lower stopping portion 156 is in contact with the circuit assembly 320, and thus the movable frame 150 cannot keep moving downwardly.

The holder 160 is disposed in the movable frame 150. As shown in FIG. 12 and FIG. 13, the holder 160 includes at least one first damping element placement portion 161, at least one second damping element placement portion 162, at least one second coil placement portion 163, at least one separation element 164, and at least one second coil start lead placement portion 165.

The first damping element placement portion 161 extends in the first direction A1. The second damping element placement portion 162 extends along the optical axis O. In other words, the first damping element placement portion 161 and the second damping element placement portion 162 extend along different directions. The arrangement direction of the two first damping element placement portions 161 is parallel with the first direction A1. Also, the arrangement direction of the two second damping element placement portions 162 is parallel with the first direction A1. In other words, the arrangement direction of the first damping element placement portions 161 is parallel with the arrangement direction of the second damping element placement portions 162.

The second coil placement portion 163 is disposed on the side of the holder 160 for placing the second coil 180. The separation element 164 and the second coil start lead placement portion 165 are close to the second coil placement portion 163. The separation element 164 is located between the two second coil start lead placement portions 165.

Figure 14:
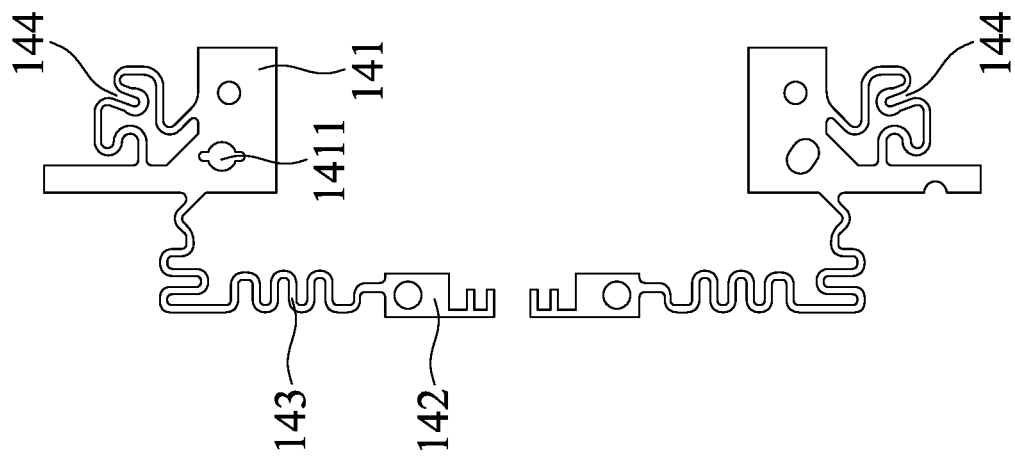
FIG. 14 is a top view of the first elastic element.
Figure 14:
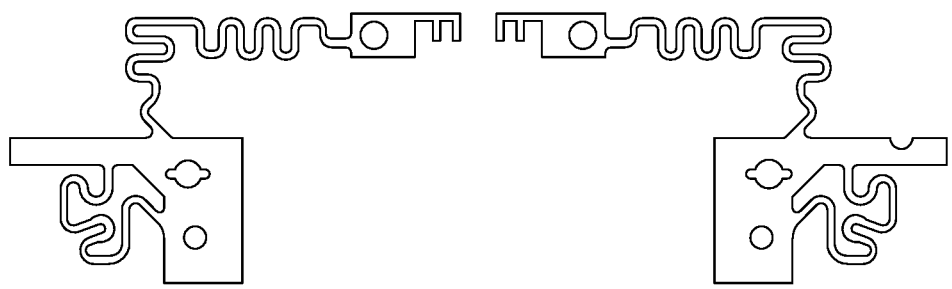
Figure 15:
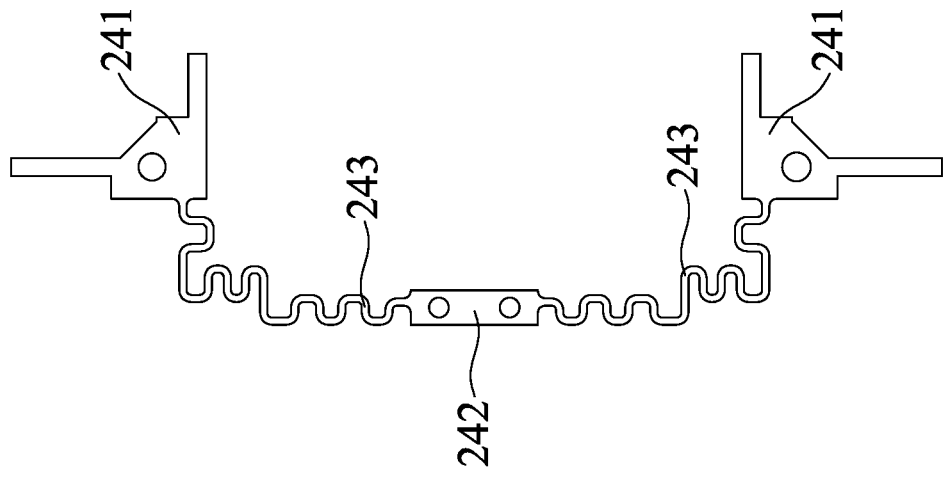
FIG. 15 is a top view of the second elastic element.
Figure 15:
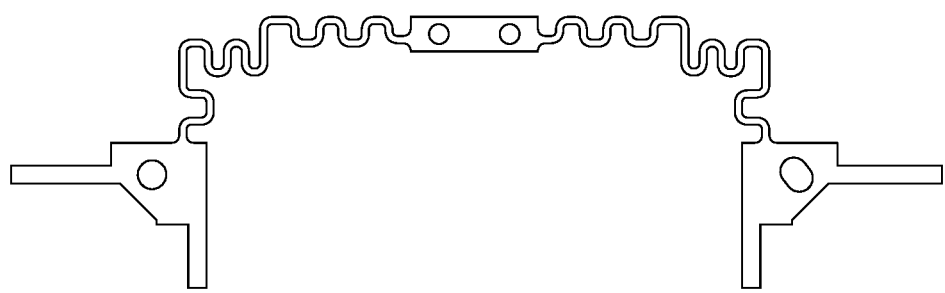
Figure 16:
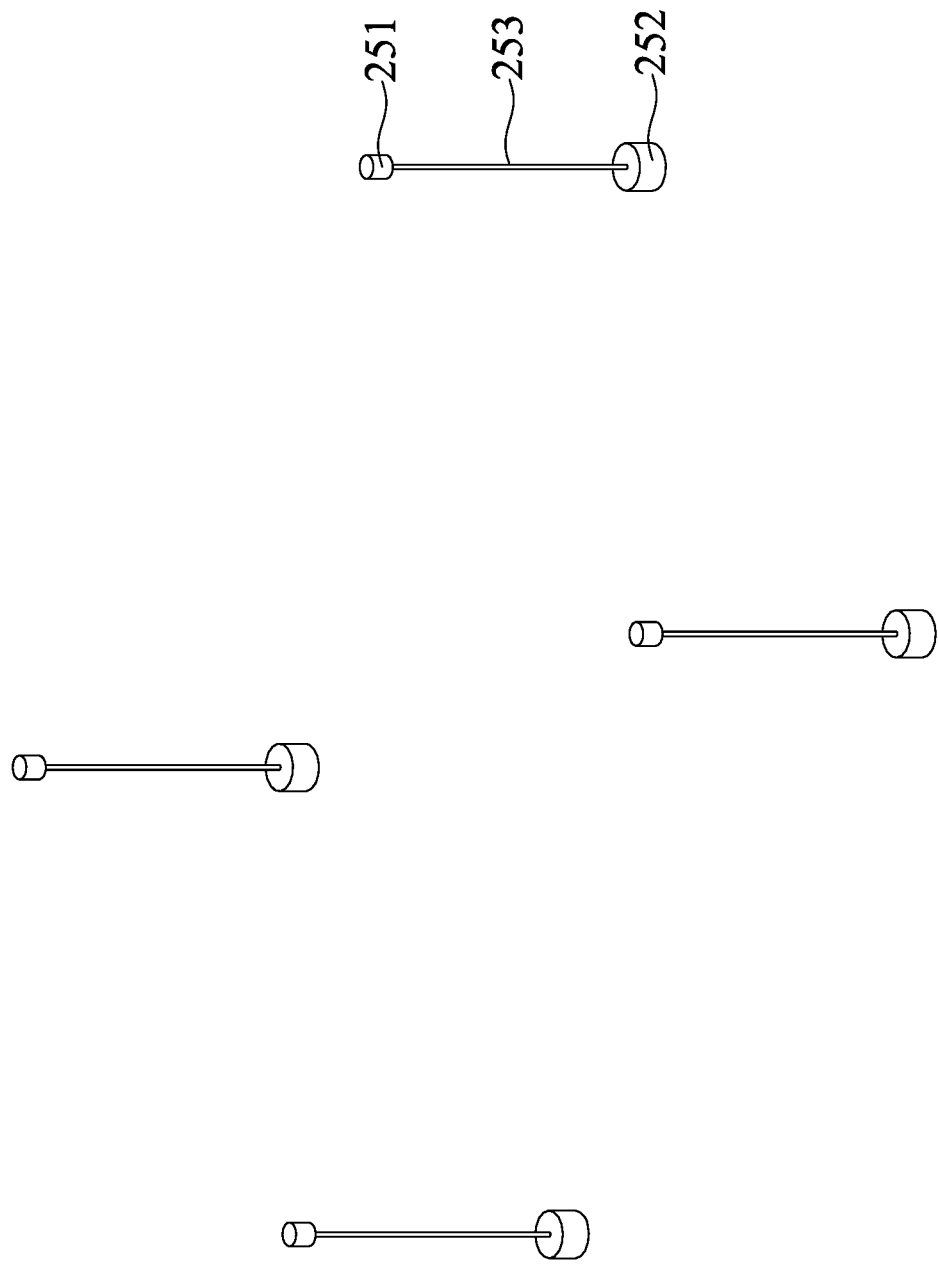
FIG. 16 is a perspective view of the third elastic element.

Please refer to FIG. 14 to FIG. 16 to understand the elastic assembly E. FIG. 14 is a top view of the first elastic element 140. FIG. 15 is a top view of the second elastic element 240. FIG. 16 is a perspective view of the third elastic element 250. The first elastic element 140 and the second elastic element 240 are made of an elastic material or a ductile material such as metal. In this technical field, the first elastic element 140 and the second elastic element 240 may be known as "spring", "leaf spring", "plate spring", etc.

The first elastic element 140 is disposed between the immovable frame 120 and the movable frame 150. The first elastic element 140 is elastically connected to the movable frame 150 and the holder 160. As shown in FIG. 14, each of the first elastic elements 140 includes a movable frame connection portion 141, a holder connection portion 142, a deformation portion 143, and a third elastic element connection portion 144. The movable frame connection portion 141 is disposed on the top surface of the movable frame 150. The movable frame connection portion 141 may include a hole 1411 that correspond to the first elastic element connection portion 154 of the movable frame 150 to strengthen the connection between the movable frame 150 and the first elastic element 140. The holder connection portion 142 is disposed on the top surface of the holder 160. The deformation portion 143 is connected to the movable frame connection portion 141 and the holder connection portion 142. The third elastic element 250 is placed in the third elastic element connection portion 144.

The second elastic element 240 is disposed between the movable frame 150 and the circuit assembly 320. The second elastic element 240 is connected to the movable frame 150 and the holder 160. As shown in FIG. 15, each of the second elastic elements 240 includes two movable frame connection portions 241, a holder connection portion 242, and two deformation portions 243. The movable frame connection portion 241 is disposed on the bottom surface of the movable frame 150. The movable frame connection portion 241 may include a structure for strengthening the connection between the movable frame 150 and the second elastic element 240. The holder connection portion 242 is disposed on the bottom surface of the holder 160. The deformation portion 243 is connected to the movable frame connection portion 241 and the holder connection portion 242.

Due to the elongation and shrinkage of the deformation portion 143 and deformation portion 243, the first elastic element 140 and the second elastic element 240 may elastically hold the holder 160 and prevent the holder 160 from getting damaged because of collision with other elements.

As shown in FIG. 16, each of the third elastic elements 250 includes an upper end 251, a lower end 252, and a middle section 253. The upper end 251 is connected to the third elastic element connection portion 144 of the first elastic element 140 while the lower end 252 is connected to the third elastic element connection portion 324 of the circuit assembly 320. The middle section 253 is connected to the upper end 251 and the lower end 252.

Since the first elastic element 140 is connected to the movable frame 150 and the holder 150, actually, the third elastic elements 250 suspend the movable frame 150 together with the holder 160 between the case 110 and the bottom 330 of the immovable part I, so that the movable frame 150 and the holder 150 are not in direction contact with the case 110 and the bottom 330, thereby reducing the collision occurred between the elements and strengthening the mechanical strength of the optical element drive mechanism 10.

As described above, due to the first elastic element 140 and the second elastic element 240, the holder 160 is movably connected to the movable frame 150, so that the holder 150 may move relative to the movable frame 150. Also, due to the third elastic element 250, the movable frame 150 is movably connected to the circuit assembly 320, so that the movable frame 150 and the holder 160 therein may move relative to the circuit assembly 320. That is, the movable part M is movable relative to the immovable part I.

Figure 17:
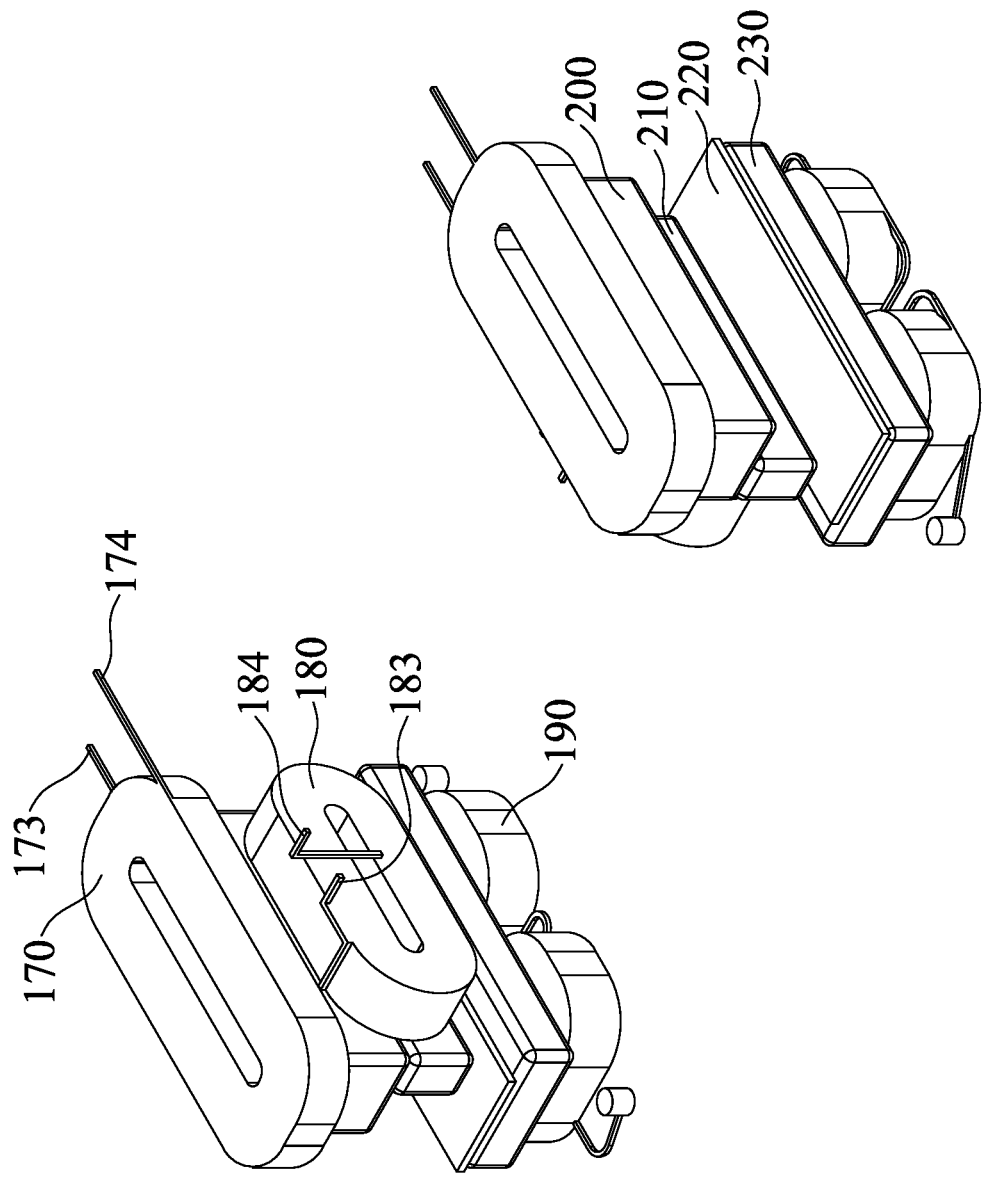
FIG. 17 is a perspective view of the drive assembly.
Figure 18:
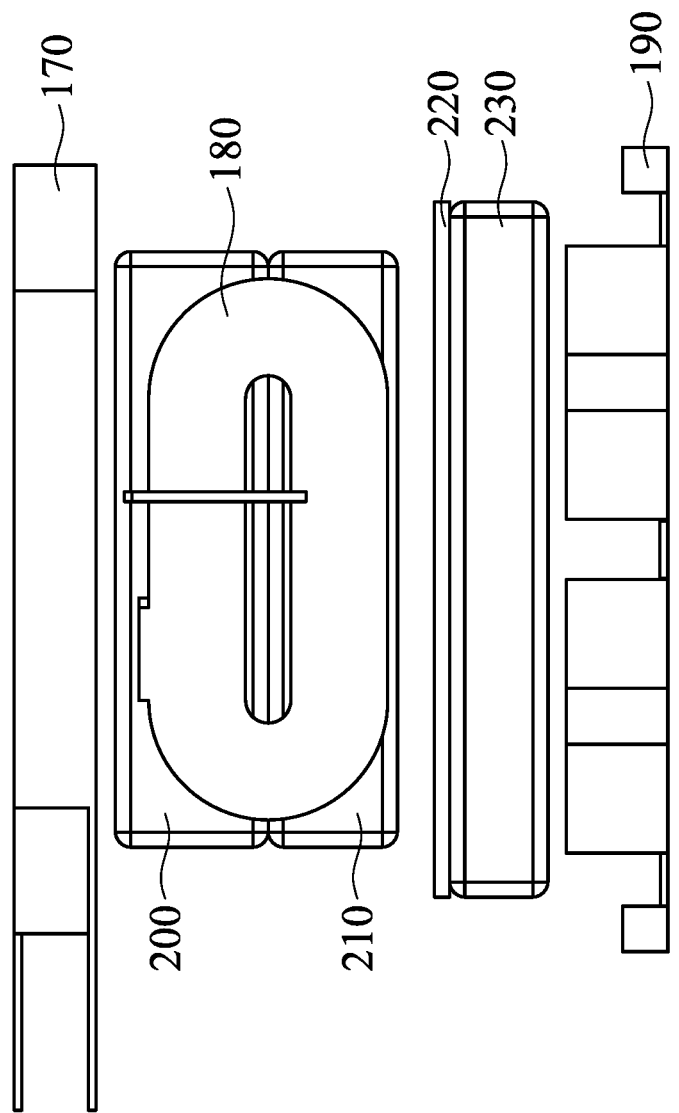
FIG. 18 is a side view of the drive assembly.
Figure 19:
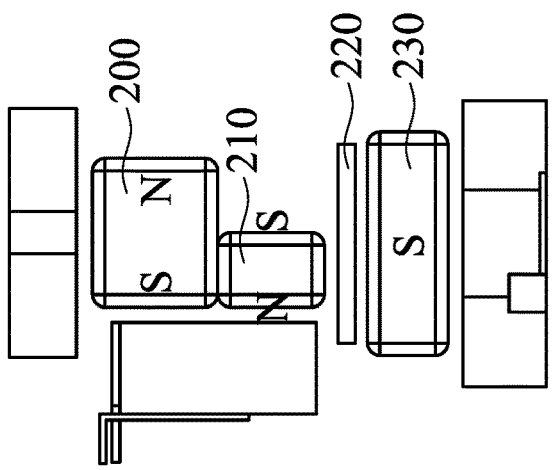
FIG. 19 is a front view of the drive assembly.
Figure 19:
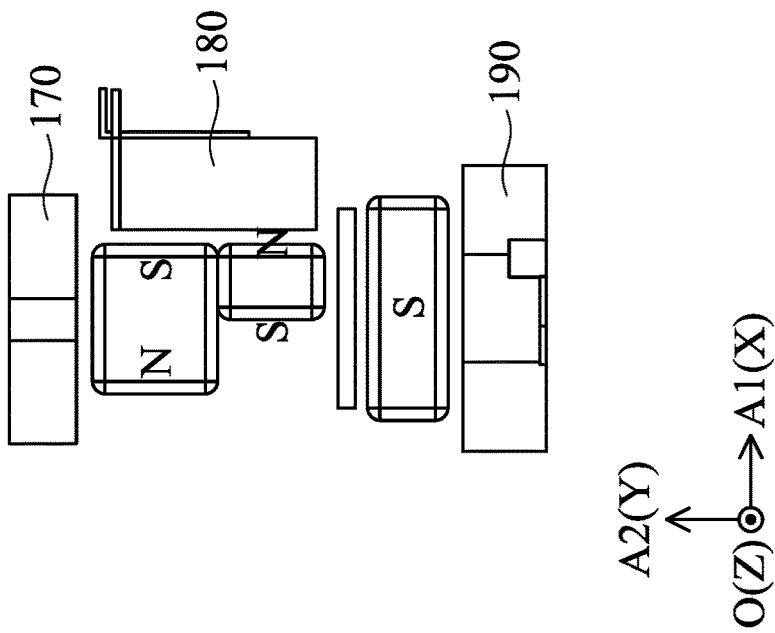
Figure 20:
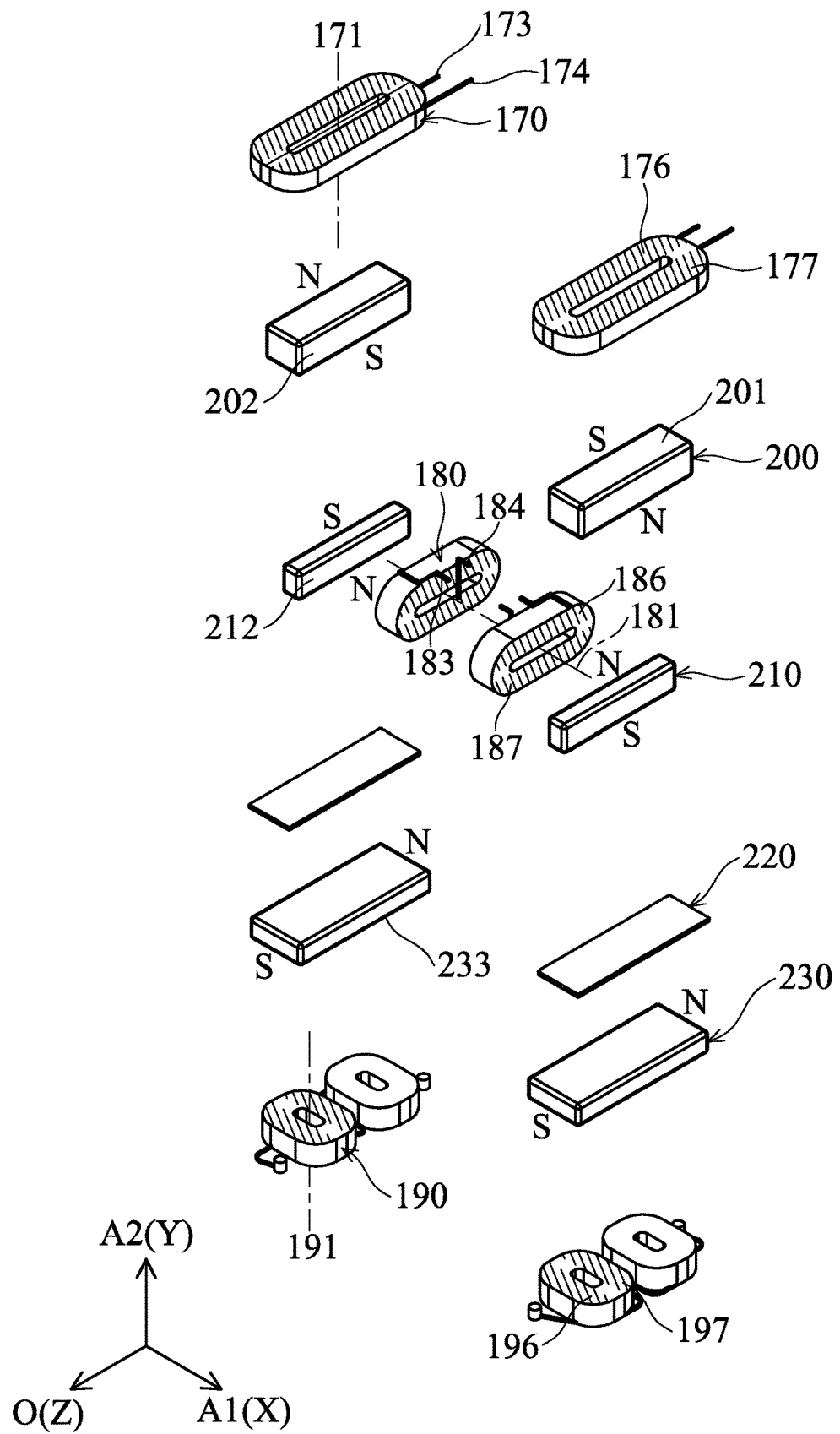
FIG. 20 is an exploded view of the drive assembly.

Please refer to FIG. 17 to FIG. 20 to understand the drive assembly D. FIG. 17 is a perspective view of the drive assembly D. FIG. 18 is a side view of the drive assembly D. FIG. 19 is a front view of the drive assembly D. FIG. 20 is an exploded view of the drive assembly D. The arrangement direction of the first coil 170, the second coil 180, and the third coil 190 is parallel with the second direction A2. When viewed from the second direction A2, the first coil 170, the second coil 180, and the third coil 190 at least partially overlap each other. Also, the arrangement direction of the first drive magnetic element 200, the second drive magnetic element 210, the magnetically-permeable element 220, and the third drive magnetic element 230 is parallel with the second direction A2. When viewed from the second direction A2, the first drive magnetic element 200, the second drive magnetic element 210, the magnetically-permeable element 220, and the third drive magnetic element 230 at least partially overlap each other.

The first coil 170 is disposed between the immovable frame 120 and the movable frame 150. A winding axis 171 of the first coil 170 is parallel with the second direction A2. The first coil 170 includes a first coil first start lead 173 and a first coil second lead 174. The second coil 180 is disposed on the second coil placement portion 163 of the holder 160. A winding axis 181 of the second coil 180 is parallel with the first direction A1. The second coil 180 includes a second coil first start lead 183 and a second coil second start lead 184. The third coil 190 is disposed on the circuit assembly 320. A winding axis 191 of the third coil 190 is parallel with the second direction A2. As described above, the winding axis 171 of the first coil 170 is not parallel with the winding axis 181 of the second coil 180. Alternatively, the winding axis 171 of the first coil 170 is perpendicular to the winding axis 181 of the second coil 180. The winding axis 171 of the first coil 170 is parallel with the winding axis 191 of the third coil 190. Therefore, the arrangement and the configuration of the first coil 170, the second coil 180, and the third coil 190 may reduce the overall thickness of the optical element drive mechanism 10 and thus achieve lightweight and save power.

The first coil 170, the second coil 180, and third coil 190 are substantially bar-like. In some embodiments, the first coil 170, the second coil 180, and third coil 190 may be rectangular, polygonal, oval, and the like. The major axis (the longer side) of the first coil 170 is parallel with the optical axis O while the minor axis (the shorter side) of the first coil 170 is parallel with the first direction A1. The major axis of the second coil 180 is parallel with the optical axis O while the minor axis of the second coil 180 is parallel with the second direction A2. The major axis of the third coil 190 is parallel with the first direction A1 while the minor axis of the third coil 190 is parallel with the optical axis O. As described above, the major axis of the first coil 170 is parallel with the major axis of the second coil 180 and the minor axis of the third coil 190. That is, the major axis of the first coil is not parallel with the major axis of the third coil 190. The maximum size of the first coil 170 in a direction that is parallel with the optical axis O is larger than the maximum size of the second coil 180 in a direction that is parallel with the optical axis O. That is, the maximum size of the first coil 170 in a direction that is parallel with the optical axis O is different than the maximum size of the second coil 180 in in a direction that is parallel with the optical axis O. The first drive magnetic element 200, the second drive magnetic element 210, and the third drive magnetic element 230 may be permanent magnets. The first drive magnetic element 200 is disposed on the first half 1511 of the first recession 151. The second drive magnetic element 210 is disposed on the second half 1512 of the first recession 151. The magnetically-permeable element 220 is disposed over the third drive magnetic element 230. In particular, the magnetically-permeable element 220 is disposed between the first drive magnetic element 200 and the third drive magnetic element 230. The magnetically-permeable element 220 is made of a material with magnetic permeability. The shape and the profile of the magnetically-permeable element 220 correspond to the shape and the profile of the third drive magnetic element 230. The magnetically-permeable element 220 may adjust the distribution of the magnetic field and may attract and concentrate the magnetic force generated by the drive assembly D. The magnetically-permeable element 220 and the third drive magnetic element 230 are disposed on the third recession 153 of the movable frame 150.

The maximum size of the first drive magnetic element 200 in the first direction A1 is greater than the maximum size of the second drive magnetic element 210 in the first direction A1. That is, the maximum size of the first drive magnetic element 200 in the first direction A1 is different from the maximum size of the second drive magnetic element 210 in the first direction A1. The maximum size of the first drive magnetic element 200 in a direction that is parallel with the optical axis O is less than the maximum size of the third drive magnetic element 230 in a direction that is parallel with the optical axis O. That is, the maximum size of the first drive magnetic element 200 in a direction that is parallel with the optical axis O is different from the maximum size of the third drive magnetic element 230 in a direction that is parallel with the optical axis O.

The first coil 170 corresponds to an upper surface 201 of the first drive magnetic element 200. The second coil 180 corresponds to a side surface 202 of the first drive magnetic element 200 and a side surface 212 of the second drive magnetic element 210 at the same time. The third coil 190 corresponds to a lower surface 233 of the third drive magnetic element 230. The upper surface 201 of the first drive magnetic element 200 and the side surface 202 of the first drive magnetic element 200 are parallel with the optical axis O. The upper surface 201 of the first drive magnetic element 200 is not parallel with the side surface 202 of the first drive magnetic element 200. The side surface 202 of the first drive magnetic element 200 is parallel with the side surface 212 of the second drive magnetic element 210. The upper surface 201 of the first drive magnetic element 200 is parallel with the lower surface 233 of the third drive magnetic element 230.

It should be noted that "the main current regions" of the first coil 170, the second coil 180, and the third coil 190 are shown in slant lines in FIG. 20. "The main current regions" represents the main regions of the first coil 170, the second coil 180, and the third coil 190 that may generate magnetic force to drive the movable part M to move. The regions that are not labeled with slant lines are not the main current regions, which may only generate weak magnetic force that is not enough for driving the movable part M to move. The area of the magnetic poles that the main current regions correspond to have to be as large as possible so as to generate magnetic force as great as possible.

For example, the main current regions of the first coil 170 includes a left half 176 and a right half 177. The direction of the current flowing through the left half 176 is opposite to the direction of the current flowing through the right half 177. From the right-hand rule that describing the relationship between the current, the magnetic field, and the magnetic force, to make the direction of the magnetic force generated by the left half 176 the same as the direction of the magnetic force generated by the right half 177, the left half 176 and the right half 177 need different directions of the magnetic field. Therefore, the left half 176 and the right half 177 need to correspond to different magnetic poles. That is, the arrangement direction of the magnetic poles of the first drive magnetic element 200 that corresponds to the first coil 170 need to be the same as the arrangement direction of the main current regions of the first coil 170. The arrangement direction of the magnetic poles represents the arrangement direction of a pair of magnetic poles (N-pole and S-pole). Since the arrangement direction of the left half 176 and the right half 177 is parallel with the first direction A1, the arrangement direction of the magnetic poles of the first drive magnetic element 200 is also parallel with the first direction A1.

When the current flows into the first coil 170, the magnetic force generated by the main current regions (i.e. the left half 176 and the right half 177) of the first coil 170 and the first drive magnetic element 200 is in the first direction A1, so that the generated magnetic force may drive the movable part M to move relative to the immovable part I in the first direction A1.

Similarly, the main current regions of the second coil 180 includes an upper half 186 and a lower half 187. The direction of the current flowing through the upper half 186 is opposite to the direction of the current flowing through the lower half 187. To make the direction of the magnetic force generated by the upper half 186 the same as the direction of the magnetic force generated by the lower half 187, the upper half 186 and the lower half 187 need different directions of the magnetic field. Therefore, the upper half 186 and the lower half 187 need to correspond to different magnetic poles. In particular, the direction of the magnetic field provided by the side surface 202 of the first drive magnetic element 200 that corresponds to the upper half 186 need to be different from the direction of the magnetic field provided by the side surface 202 of the first drive magnetic element 200 that corresponds to the lower half 187. That is, the arrangement direction of the magnetic poles of the second drive magnetic element 210 is parallel with the arrangement direction of the magnetic poles of the first drive magnetic element 200 and the first direction A1. However, the magnetic pole of the first drive magnetic element 200 that faces the second coil 180 is different from the magnetic pole of the second drive magnetic element 210 that faces the second coil 180. In FIG. 20, the S-pole of the first drive magnetic element 200 faces the second coil 180 while the N-pole of the second drive magnetic element 210 faces the second coil 180. However, in some other embodiments, the N-pole of the first drive magnetic element 200 faces the second coil 180 while the S-pole of the second drive magnetic element 210 faces the second coil 180.

When the current flows into the second coil 180, the magnetic force generated by the main current regions (i.e. the upper half 186 and the lower half 187) of the second coil 180 and the first drive magnetic element 200 and the second drive magnetic element 210 is in the second direction A2, so that the generated magnetic force may drive the movable part M to move relative to the immovable part I in the second direction A2.

Figure 24:
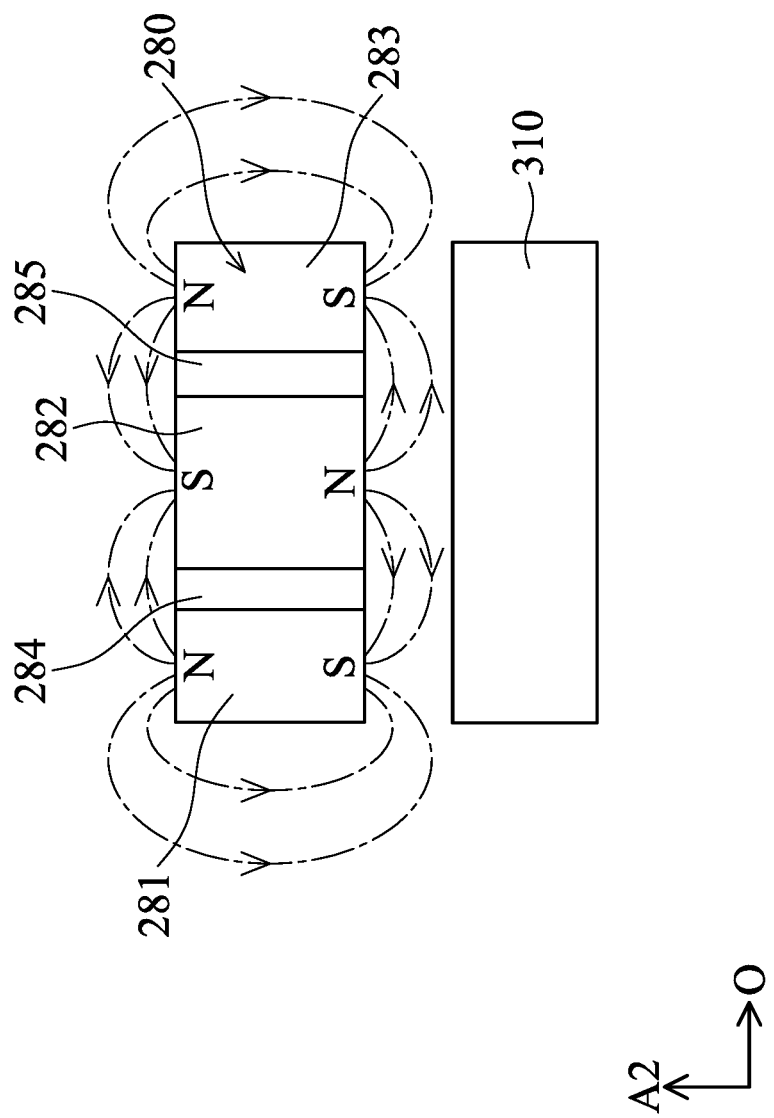
FIG. 24 is a schematic view of the third reference magnetic element and the third sensing element.

Similarly, the main current regions of the third coil 190 includes a front half 196 and a back half 197. The direction of the current flowing through the front half 196 is opposite to the direction of the current flowing through the back half 197. To make the direction of the magnetic force generated by the front half 196 the same as the direction of the magnetic force generated by the back half 197, the front half 196 and the back half 197 need different directions of the magnetic field. Therefore, the third drive magnetic element 230 is a multipole magnet and the direction of the magnetic poles of the third drive magnetic element 230 is parallel with the second direction A2 (as shown in FIG. 24).

When the current flows into the third coil 190, the magnetic force generated by the main current regions (i.e. the front half 196 and the back half 197) of the third coil 190 and the third drive magnetic element 230 is in a direction that is parallel with the optical axis O, so that the generated magnetic force may drive the movable part M to move relative to the immovable part I in the optical axis O. It should be noted that the main current regions of the third coil 190 is less than the main current regions of the first coil 170 and the second coil 180, so that the number of third coils 190 is greater than the number of first coils 170 and the number of second coils 180.

As described above, the arrangement direction of the magnetic poles of the first drive magnetic element 200 is parallel with the arrangement direction of the magnetic poles of the second drive magnetic element 210. However, the arrangement direction of the magnetic poles of the first drive magnetic element 200 is not parallel with the arrangement direction of the magnetic poles of the third drive magnetic element 230. Alternatively, the arrangement direction of the magnetic poles of the first drive magnetic element 200 is perpendicular to the arrangement direction of the magnetic poles of the third drive magnetic element 230.

In some embodiments, to enhance the stability of the movable part M when it moves relative to the immovable part I, a damping element 340 (illustrated in FIG. 10 to FIG. 13) may be placed. The damping element 340 is made of a material that may absorb shock and may inhibit vibration, such as a gel. When the optical element drive mechanism 10 is impacted by an external force, the damping element 340 may prevent a severe collision between the holder 150 and the movable frame 160 and/or between the movable part M and the immovable part I. Furthermore, the damping element 340 may help the movable part M to return to its original position quickly when it is impacted. Therefore, the damping element 340 may improve the mechanical strength of the optical element drive mechanism 10.

The damping element 340 may be disposed on the upper stopping portion 155 of the movable frame 150, the lower stopping portion 156 of the movable frame 150, the first damping element placement portion 161 of the holder 160, and the second damping element placement portion 162 of the holder 160. Therefore, the upper stopping portion 155 and the lower stopping portion 156 may be referred to as "the movable frame damping element placement portion". When the damping element 340 is disposed on the upper stopping portion 155 of the movable frame 150, the damping element 340 is disposed between the movable frame 150 and the case 110. When the damping element 340 is disposed on the lower stopping portion 156 of the movable frame 150, the damping element 240 is disposed between the movable frame 150 and the circuit assembly 320. When the damping element 340 is disposed on the first damping element placement portion 161 of the holder 160 and/or the second damping element placement portion 162 of the holder 160, the damping element 340 is disposed between the holder 160 and the movable frame 150.

In particular, when the first coil 170 and the first drive magnetic element 200 drive the movable part M to move in the first direction A1, the damping element 340 disposed on the first damping element placement portion 161 of the holder 160 may inhibit the shake and collision between the holder 160 and the movable frame 150 in the first direction A1. When the second coil 180 and the second drive magnetic element 210 drive the movable part M to move upwardly in the second direction A2, the damping element 340 disposed on the upper stopping portion 155 of the movable frame 150 may inhibit the shake and collision between the movable frame 150 and the immovable frame 120 in the first direction A1. Similarly, when the second coil 180 and the second drive magnetic element 210 drive the movable part M to move downwardly in the second direction A2, the damping element 340 disposed on the lower stopping portion 156 of the movable frame 150 may inhibit the shake and collision between the movable frame 150 and the circuit assembly 320 in the first direction A1. Furthermore, when the third coil 190 and the third drive magnetic element 230 drive the movable part M to move in the optical axis O, the damping element 340 disposed on the second damping element placement portion 162 of the holder 160 may inhibit the shake and collision between the holder 160 and the movable frame 150 in a direction that is parallel with the optical axis O. With suitable damping effects, the control speed and control accuracy may be significantly enhanced. Additionally, due to the aforementioned configuration, the stability of the damping element 340 is high and thus the damping element 340 is not easy to drop off. At the same time, the space is utilized and the overall optical element drive mechanism 10 is miniaturized.

Figure 21:
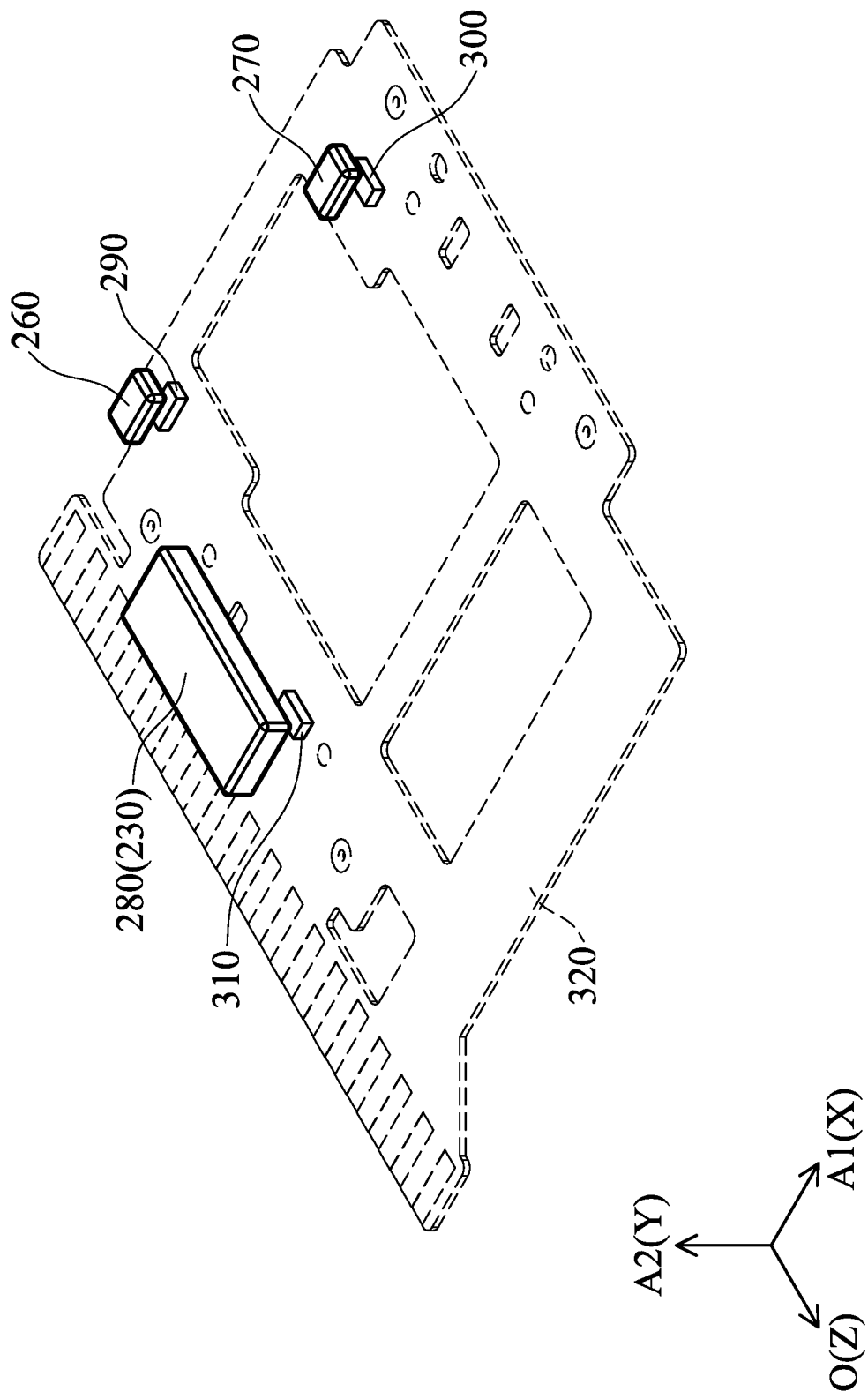
FIG. 21 is a schematic view of the circuit assembly and the position sensing assembly, wherein the circuit assembly is illustrated with dotted lines.
Figure 22:
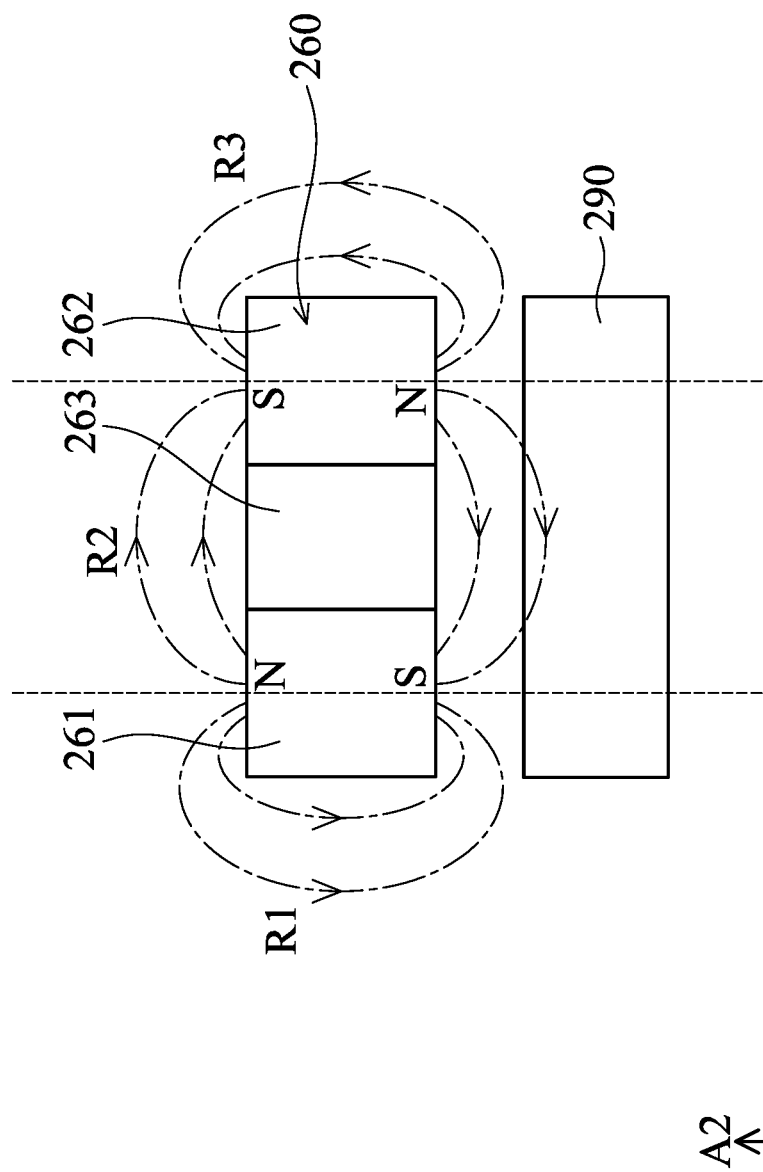
FIG. 22 is a schematic view of the first reference magnetic element and the first sensing element.
Figure 23:
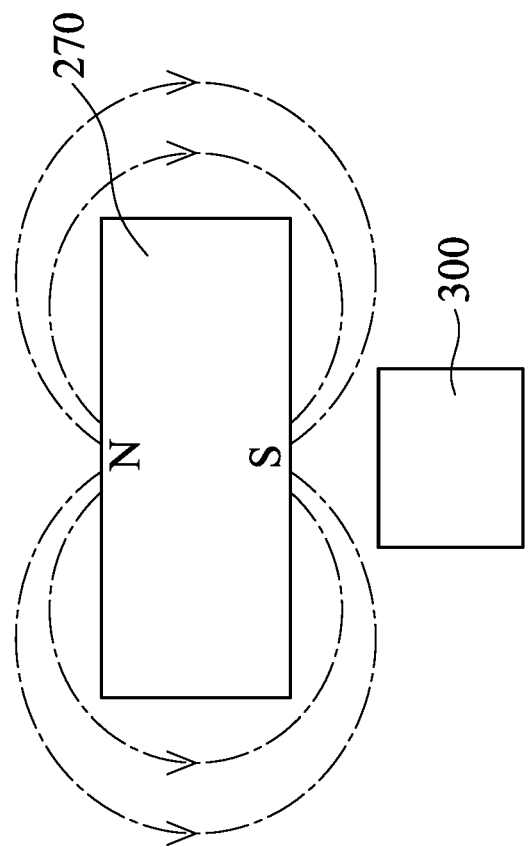
FIG. 23 is a schematic view of the second reference magnetic element and the second sensing element.

Please refer to FIG. 21 to FIG. 24 to understand the position sensing assembly S. FIG. 21 is a schematic view of the circuit assembly 320 and the position sensing assembly S, wherein the circuit assembly 320 is illustrated with dotted lines. FIG. 22 is a schematic view of the first reference magnetic element 260 and the first sensing element 290. FIG. 23 is a schematic view of the second reference magnetic element 270 and the second sensing element 300. FIG. 24 is a schematic view of the third reference magnetic element 280 and the third sensing element 310.

The first reference magnetic element 260, the second reference magnetic element 270, and the third reference magnetic element may be a permanent magnet. The first sensing element 290, the second sensing element 300, and the third sensing element 310 may be a Hall sensor, a giant magneto resistance (GMR) sensor, a tunneling magneto resistance (TMR) sensor, and the like.

It should be noted that the drive magnetic element may be used as the reference magnetic element in some embodiments, and thus no additional reference magnetic element is needed so as to simplify the manufacture process and reduce the cost. For example, in this embodiment, the third drive magnetic element 230 on the left side may be used as the third reference magnetic element 280. In the following, the third reference magnetic element 280 is exact the third drive magnetic element 230 of the left side, these two terms refer to the same element.

The first reference magnetic element 260 is disposed on the movable frame 150. The first sensing element 290 is disposed on the bottom surface of the circuit assembly 320 and is electrically connected to the circuit assembly 320. The first reference magnetic element 260 and the first sensing element 290 are located on different sides of the circuit assembly 320. The first sensing element 290 corresponds to the first reference magnetic element 260 to sense the movement of the movable frame 150 relative to the circuit assembly 320 in the first direction A1, i.e., the movement of the movable part M relative to the immovable part M in the first direction A1.

As shown in FIG. 22, the first reference magnetic element 260 includes at least one pair of magnetic poles and the first reference magnetic element 260 is a multipole magnet. The multiple pairs of magnetic poles of the first reference magnetic element 260 are arranged in the first direction A1. The first reference magnetic element 260 includes at least two magnetic domains 261, 262 and a depletion region 263 located between the magnetic domain 261 and the magnetic domain 262. When a multi-pole magnet is manufactured, only the magnetic domain 261 and the magnetic domain 262 are magnetized, so the depletion region 263 is formed. The magnetic domain 261 and the magnetic domain 262 have a pair of N-pole and S-pole, respectively. Additionally, the arrangement direction of the magnetic poles of the magnetic domain 261 and the arrangement direction of the magnetic poles of the magnetic domain 262 is parallel with the second direction A2.

By designing the first reference magnetic element 260 as a multi-pole magnet with multiple magnetic domains, the magnetic lines of force of the first reference magnetic element 260 are more intense. Additionally, the sensing accuracy may be further improved without increasing the volume of the first reference magnetic element 260. As a result, the size of the first reference magnetic element 260 may also be reduced, thereby the power consumption of the optical element drive mechanism 10 may be reduced and miniaturization may be achieved.

The S-pole of the magnetic domain 261 faces the first sensing element 290, and the N-pole of the magnetic domain 262 faces the first sensing element 290. It should be noted that in some other embodiments, the N-pole of the magnetic domain 261 faces the first sensing element 290, and the S-pole of the magnetic domain 262 faces the first sensing element 290.

Since the magnetic lines of force points to the S-pole from the N-pole, the side that the first reference magnetic element 260 faces the first sensing element 290 is divided into a first region R1, a second region R2, and a third region R3 by the different directions of the magnetic lines of force. When the first sensing element 290 is in the first region R1, the sensed magnetic lines of force point to the S-pole of the magnetic domain 261 from the N-pole of the magnetic domain 261. When the first sensing element 290 is in the second region R2, the sensed magnetic lines of force point to the S-pole of the magnetic domain 261 from the N-pole of the magnetic domain 262. When the first sensing element 290 is in the third region R3, the sensed magnetic lines of force point to the S-pole of the magnetic domain 262 from the N-pole of the magnetic domain 262. Moreover, the density of magnetic lines of force may be different in the first region R1, the second region R2, and the third region R3.

When the movable frame 150 moves in the first direction A1, the first reference magnetic element 260 disposed on the movable frame 150 also moves relative to the first sensing element 290 in the first direction A1, so that the first sensing element 290 may sense the change of the magnetic field, including the density change of the magnetic lines of force and/or the direction change of the magnetic lines of force. The movement of the movable frame 150 in the first direction A1 may be known accurately via the density change of the magnetic lines of force and/or the direction change of the magnetic lines of force sensed by the first sensing element 290.

The second reference magnetic element 270 is disposed on the holder 160. The second sensing element 300 is disposed on the bottom surface of the circuit assembly 320 and is electrically connected to the circuit assembly 320. The second reference magnetic element 270 and the second sensing element 300 are located on different sides of the circuit assembly 320. The second sensing element 300 corresponds to the second reference magnetic element 270 to sense the movement of the holder 160 relative to the circuit assembly 320 in the second direction A2, i.e., the movement of the movable part M relative to the immovable part M in the second direction A2.

As shown in FIG. 23, the second reference magnetic element 270 includes at least one pair of magnetic poles but the second reference magnetic element 270 is not a multi-pole magnet. That is, the number of magnetic poles of the second reference magnetic element 270 is different from the number of magnetic poles of the first reference magnetic element 260. The arrangement direction of the magnetic poles of the second reference magnetic element 270 is parallel with the second direction A2. In other words, the arrangement direction of the magnetic poles of the second reference magnetic element 270 is not parallel with the first direction A1.

The S-pole of the second reference magnetic element 270 faces the second sensing element 300. It should be noted that, in some other embodiments, the N-pole of the second reference magnetic element 270 faces the second sensing element 300. Since the second reference magnetic element 270 only includes one pair of magnetic poles, the second sensing element 300 may only sense the same direction of the magnetic lines. Compared to the first sensing element 290, Compared to the first sensing element 290, the second sensing element 300 can only sense the density change of the magnetic lines but cannot sense the direction change of the magnetic lines.

When the holder 160 moves in the second direction A2, the second reference magnetic element 270 disposed on the holder 160 also moves relative to the second sensing element 300 in the second direction A2, so that the second sensing element 300 may sense the density change of the magnetic lines of force. The movement of the holder 160 in the second direction A2 may be known accurately via the direction change of the magnetic lines of force sensed by the second sensing element 300.

As described above, the third drive magnetic element 230 is disposed on the movable frame 150, i.e. the third reference magnetic element 280 is disposed on the movable frame 150. The third sensing element 310 is disposed on the bottom surface of the circuit assembly 320 and is electrically connected to the circuit assembly 320. In some embodiments, the third sensing element 310 is disposed in the third coil 190 to save the space and achieve miniaturization. The third reference magnetic element 280 and the third sensing element 310 are located on different sides of the circuit assembly 320. The third sensing element 310 corresponds to the third reference magnetic element 280 to sense the movement of the movable frame 150 relative to the circuit assembly 320 in the optical axis O, i.e., the movement of the movable part M relative to the immovable part M in the optical axis O. As described above, the arrangement direction of the magnetic poles of the third drive magnetic element 230 is parallel with the second direction A2, i.e. the arrangement direction of the third reference magnetic element 280 is parallel with the second direction A2. That is, the arrangement direction of the third reference magnetic element 280 is not parallel with the first direction A1 and the optical axis O.

As shown in FIG. 24, the third reference magnetic element 280 includes at least one pair of magnetic poles and the third reference magnetic element 280 is a multipole magnet, i.e. the number of pairs of magnetic poles of the third reference magnetic element 280 is different from the number of pairs of the magnetic poles of the second reference magnetic element 270. The multiple pairs of magnetic poles of the third reference magnetic element 280 are arranged along the optical axis O. The third reference magnetic element 280 includes three magnetic domains 281, 282, 283, a depletion region 284 located between the magnetic domain 281 and the magnetic domain 282, and a depletion region 285 located between the magnetic domain 282 and the magnetic domain 283. It should be noted that since the magnetic domain 282 corresponds to main current regions of the two third coil 190, the range of the magnetic domain 282 is greater than the range of the magnetic domain 281 and the magnetic domain 283. For example, the volume of the magnetic domain 282 is twice as large as the volume of the magnetic domain 281 and the magnetic domain 283.

The S-pole of the magnetic domain 281 and the S-pole of the magnetic domain 283 are toward the third sensing element 310 while the N-pole of the magnetic domain 282 faces the third sensing element 310. However, in some other embodiments, the N-pole of the magnetic domain 281 and the N-pole of the magnetic domain 283 are toward the third sensing element 310 while the S-pole of the magnetic domain 282 faces the third sensing element 310.

Since the third reference magnetic element 280 has more than one pair of magnetic poles, similar to the first sensing element 290, the third sensing element 310 may sense the density change of the magnetic lines of force and the direction change of the magnetic lines of force. When the movable frame 150 moves along the optical axis O, the third reference magnetic element 280 disposed on the movable frame 150 also moves relative to the third sensing element 310 along the optical axis O, so that the third sensing element 310 may sense the density change of the magnetic lines of force and/or the direction change of the magnetic lines of force. The movement of the movable frame 150 in the optical axis O may be known accurately via the density change of the magnetic lines of force and/or the direction change of the magnetic lines of force sensed by the third sensing element 310. Due to the aforementioned features, the interference generated between the first sensing element 290, the second sensing element 300, and the third sensing element 310 may be improved, and the overall optical element drive mechanism 10 may be further miniaturized. Furthermore, the recesses 334 protect the first sensing element 290, the second sensing element 300, and the third sensing element 310, so that the recesses 334 prevent the first sensing element 290, the second sensing element 300, and the third sensing element 310 from getting damaged because of collision with other elements. Therefore, the overall stability and the reliability of the optical element drive mechanism 10 are enhanced.

As described above, the optical element drive mechanism 10 may be driven in at least three directions via the drive assembly D, and the movement in the at least three directions may be sensed by the sensing assembly S. Also, the drive signal may be corrected to achieve closed-loop feedback.

The elements of the optical element drive mechanism 10 are described above. Next, how the optical element drive mechanism 10 is assembled will be described in detail. The order of the operation is not limited.

The first coil 170 is wound and then mounted to the bottom surface of the immovable frame 120. The first drive magnetic element 290 and the second drive magnetic element 210 are mounted to the first recession 151 of the movable frame 150. The magnetically-permeable element 220 and the third drive magnetic element 230 are mounted to the third recession 153 of the movable frame 150. The first reference magnetic element 260 is mounted to the movable frame 150. The second coil 180 is wound and then mounted to the holder 160. The third coil 190 is wound and then the third coil 190, the first sensing element 290, the second sensing element 300, the third sensing element 310 are mounted to the circuit assembly 320. Then, the circuit assembly 320 is mounted to the bottom 330.

The movable frame 150 is connected to the holder 160 via the first elastic element 140 and the second elastic element 240. The movable frame 150 is connected to the circuit assembly 320 on the bottom 330 via the third elastic element 250. Finally, the case 110 and the immovable frame 120 are mounted to finish assembling the optical element drive mechanism 1.

Figure 25:
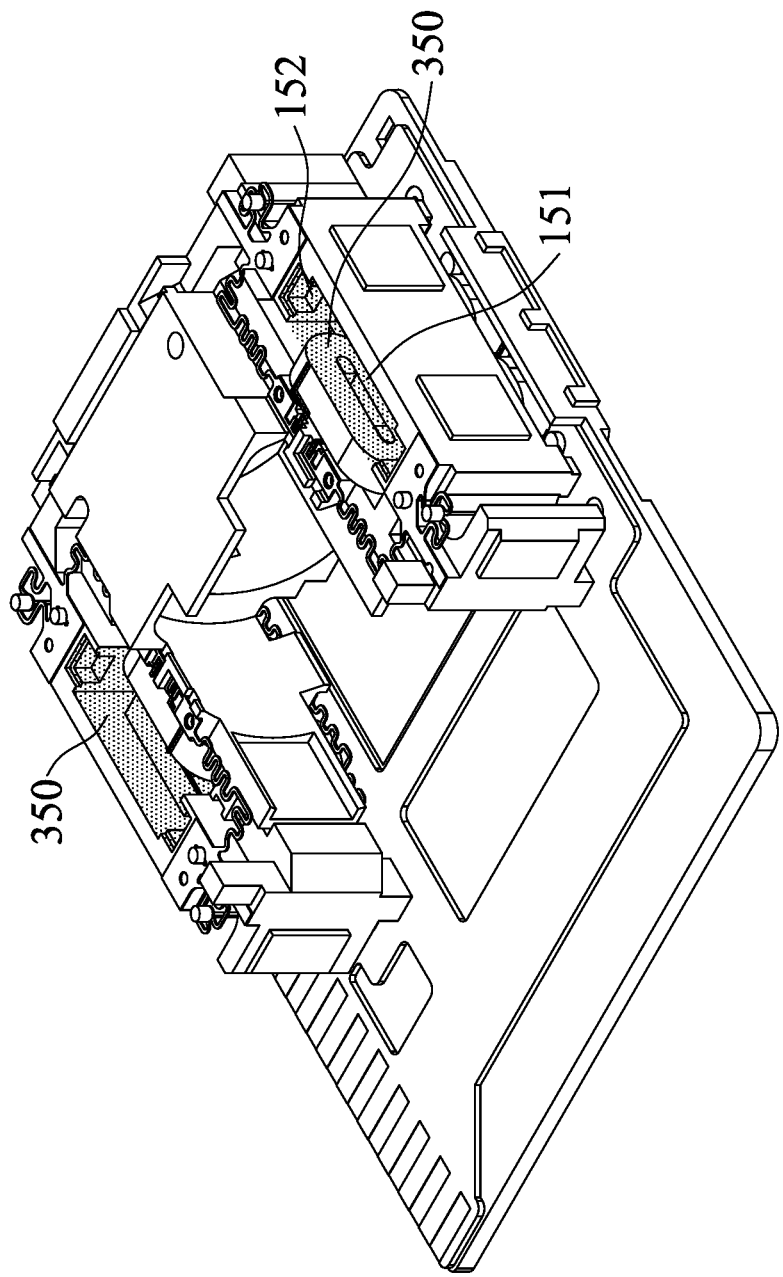
FIG. 25 is a perspective view of the optical element drive mechanism with some elements omitted.
Figure 26:
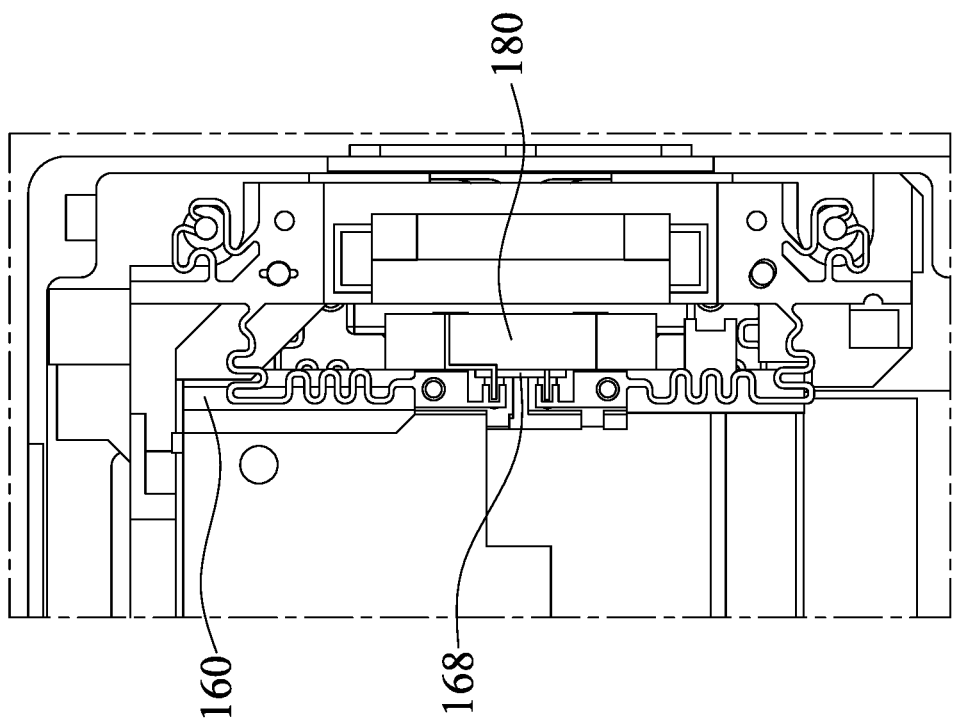
FIG. 26 is a top view of the optical element drive mechanism with some elements omitted.

In some embodiments, when assembling the optical element drive mechanism 10, an adhesion element 350 may be placed to strengthen the connection between the elements. Please refer to FIG. 25 and FIG. 26 to understand the adhesion element 350. 25 FIG. 25 is a perspective view of the optical element drive mechanism 10 with some elements omitted. FIG. 26 is a top view of the optical element drive mechanism 10 with some elements omitted.

Different elements may be adhered to each other by the adhesion element 350. The adhesion element 350 may be made of an adhesion material, a conductive material, or an insulation material, such as resin. The resin material may include UV curable resin and heat curable resin. The UV curable resin is cured by irradiation of ultraviolet (UV) light while the heat curable resin is cured by heating. Furthermore, the adhesion element 350 generally has good elasticity and good covering ability and thus the adhesion element 350 may protect the element(s). Additionally, the adhesion element 350 may reduce the probability of particles such as dust or mist entering the element(s). If the adhesion element 350 is made of an insulation material, insulation may be achieved. The steps for applying the adhesion element 350 is generally referred to as "glue dispensing", which may be conducted manually or mechanically.

For example, before mounting the first drive magnetic element 200 and the second drive magnetic element 210 to the first recession 151 of the movable frame 150, the adhesion element 350 may be applied to the first recession 151, so that at least part of the adhesion element 350 is received in the first recession 151. Then, the first drive magnetic element 200 and the second drive magnetic element 210 are mounted to the first recession 151, so that the adhesion element 350 is in direct contact with the movable frame 150, the first drive magnetic element 200, and the second drive magnetic element 210.

Also, the adhesion element 350 may be further applied to the second recession 152, so that at least part of the adhesion element 350 is received in the second recession 152. The adhesion element 350 in the second recession 152 is in direct contact with the movable frame 150 and the first drive magnetic element 200. Furthermore, the outflow-proof structure 1521 may prevent the adhesion element 350 from an outflow.

It should be noted that the adhesion element 350 applied to the first recession 151 and the adhesion element 350 applied to the second recession 152 may be different. For example, the adhesion element 350 in the first recession 151 may be heat curable resin while the adhesion element 350 in the second recession 152 may be UV curable resin. The adhesion element 350 may be chosen according to the actual needs.

Additionally, as shown in FIG. 26, a trench 168 is formed between the holder 160 and the second coil 180. The adhesion element 350 may also be disposed on the trench 168, so that the adhesion element 350 is in direct contact with the holder 160 and the second coil 180 to strengthen the connection between the holder 160 and the second coil 180.

Figure 27:
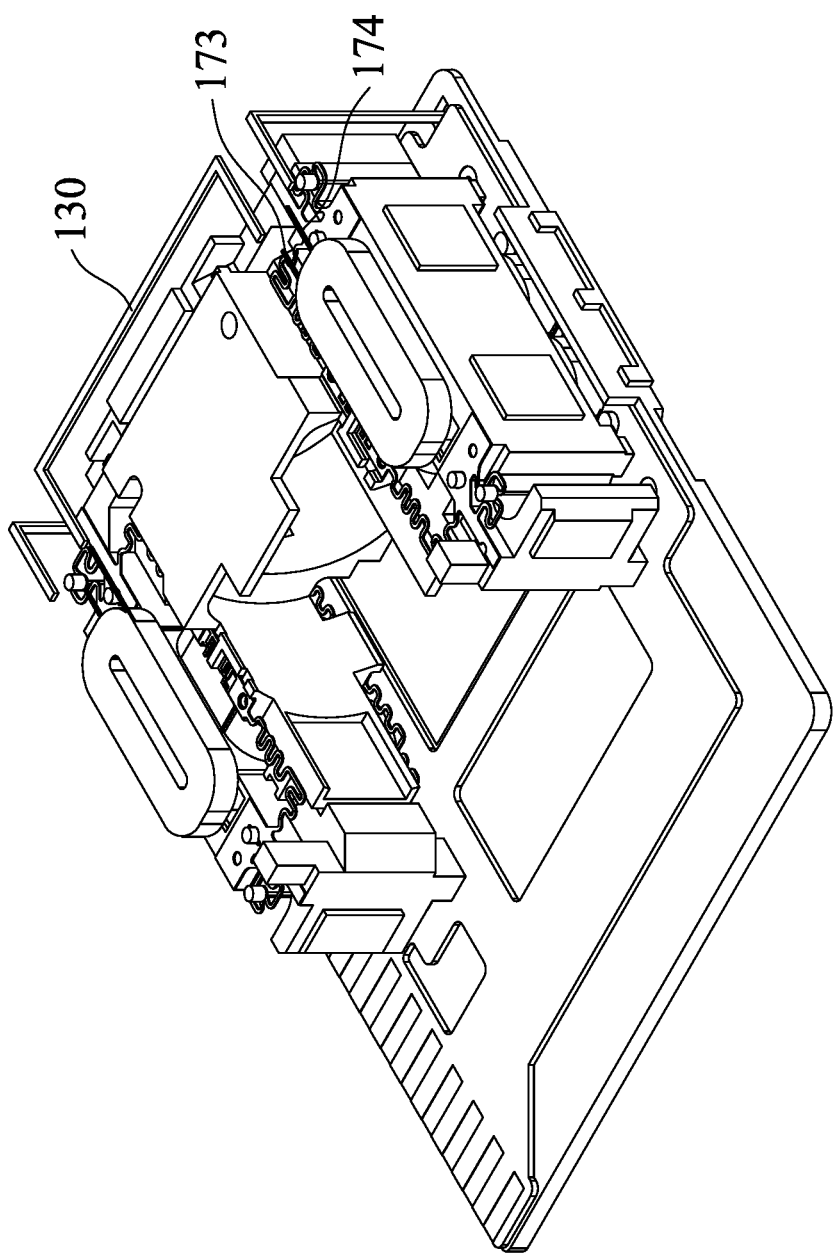
FIG. 27 is a perspective view of the optical element drive mechanism with some elements omitted.
Figure 27:
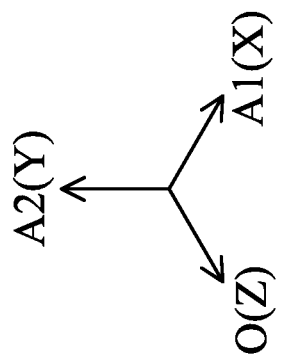
Figure 28:
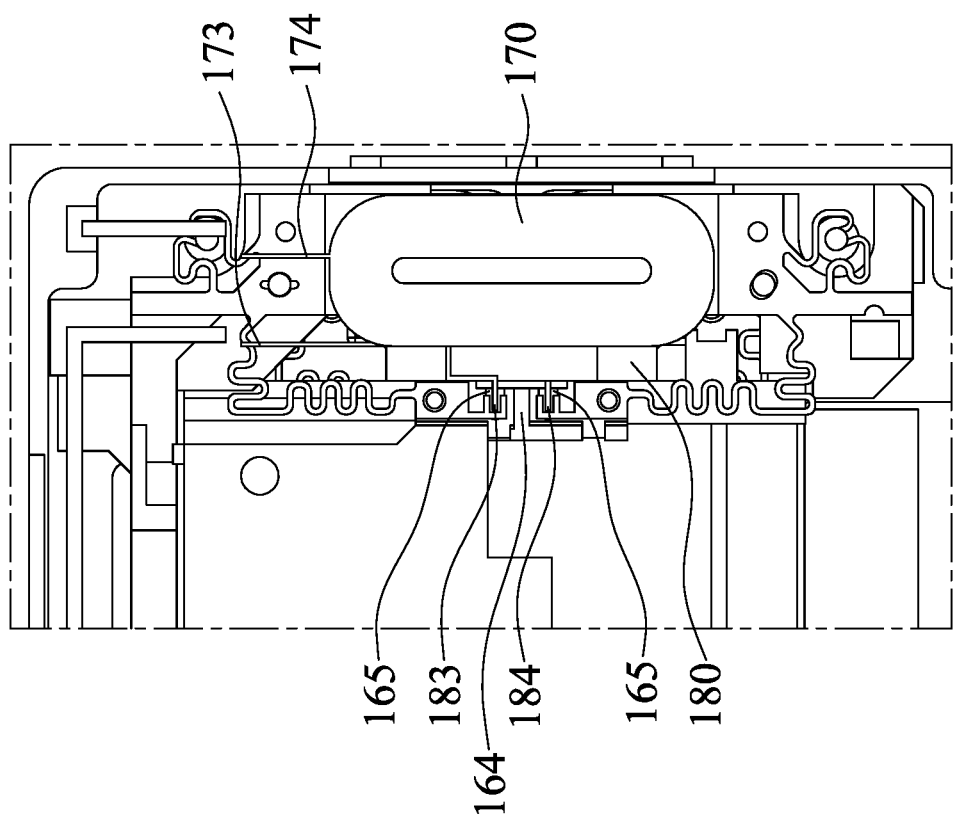
FIG. 28 is a top view of the optical element drive mechanism with some elements omitted.

Lastly, please refer to FIG. 27 and FIG. 28 to understand how the current flows into and flows out the optical element drive mechanism 10. FIG. 27 is a perspective view of the optical element drive mechanism 10 with some elements omitted. FIG. 28 is a top view of the optical element drive mechanism 10 with some elements omitted.

It should be understood that the immovable frame 120 is omitted in FIG. 27 and FIG. 28 to clearly illustrate the embedded circuit 130 embedded in the immovable frame 120. As shown in FIG. 27 and FIG. 28, the first coil first start lead 173 and the first coil second start lead 174 are electrically connected to the embedded circuit 130. The second coil first start lead 183 and the second coil second start lead 184 are disposed on the second coil start lead placement portion 165 of the holder 160. Also, the second coil first start lead 183 and the second coil second start lead 184 are electrically connected to two of the first elastic elements 140. It should be noted that the separation element 164 is disposed between the second coil first start lead 183 and the second coil second start lead 184 to avoid short circuit caused by the contact between the second coil first start lead 183 and the second coil second start lead 184.

Additionally, since the upper end 251 of the third elastic element 250 is connected to the first elastic element 140 and the lower end 252 is connected to the circuit assembly 320, so that the current input via the outside electrical connection portion 327 of the circuit assembly 320 may be transmitted to the first elastic element 140 via the third elastic element 250. In this embodiment, the current does not flow through the second elastic element 240, and the second elastic element 240 provides support effects.

As described above, the first coil 170 is electrically connected to the circuit assembly 320 via the embedded circuit 130 embedded in the immovable frame 120. The second coil 180 is electrically connected to the circuit assembly 320 via the first elastic element 240 and the third elastic element 250. In other words, the two second coils 180 are electrically connected to each other via the first elastic element 140, the third elastic element 250, and the circuit assembly 320. The circuit assembly 320 may integrate the conduction wires.

Based on the present disclosure, an optical element drive mechanism is provided. The optical element drive mechanism may be driven in at least three directions by the drive assembly. The drive assembly and the position sensing assembly are designed to achieve displacement correction and displacement compensation. The circuit assembly may integrate the conduction wires. Furthermore, the optical element drive mechanism is easy to be assembled and has great mechanical strength.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element drive mechanism, comprising:
   an immovable part;
   a movable part movable relative to the immovable part, wherein the movable part holds an optical element with an optical axis;
   a drive assembly driving the movable part to move relative to the immovable part, wherein at least part of the drive assembly is disposed on the immovable part; and
   an adhesion element,
   wherein the drive assembly comprises a circuit unit and a drive magnetic unit, the circuit unit comprises a first coil and a second coil, the drive magnetic unit comprises a first drive magnetic element and a second drive magnetic element, the first coil corresponds to an upper surface of the first drive magnetic element, the second coil corresponds to a side surface of the first drive magnetic element and a side surface of the second drive magnetic element, and the side surface of the first drive magnetic element is parallel with the side surface of the second drive magnetic element,
   wherein the movable part comprises a movable frame receiving at least part of the drive magnetic unit, and the adhesion element is in direct contact with the first drive magnetic element, the second drive magnetic element, and the movable frame.

2. The optical element drive mechanism as claimed in claim 1, wherein a winding axis of the first coil is not parallel with a winding axis of the second coil.

3. The optical element drive mechanism as claimed in claim 2, wherein the winding axis of the first coil is perpendicular to the winding axis of the second coil.

4. The optical element drive mechanism as claimed in claim 1, wherein a maximum size of the first coil in a direction that is parallel with the optical axis is different from a maximum size of the second coil in a direction that is parallel with the optical axis, or, the maximum size of the first coil in a direction that is parallel with the optical axis is greater than the maximum size of the second coil in a direction that is parallel with the optical axis.

5. The optical element drive mechanism as claimed in claim 1, wherein the upper surface of the first drive magnetic element and the side surface of the first drive magnetic element are parallel with the optical axis, and the upper surface of the first drive magnetic element is not parallel with the side surface of the first drive magnetic element.

6. The optical element drive mechanism as claimed in claim 1, wherein the movable part comprises a first recession facing the second drive magnetic element and receiving at least part of the adhesion element.

7. The optical element drive mechanism as claimed in claim 6, wherein the movable part further comprises a second recession receiving at least part of the adhesion element, the adhesion element in the second recession is in direct contact with the first drive magnetic element and the movable frame, and the second recession comprises an outflow-proof structure to prevent the adhesion element from an outflow.

8. The optical element drive mechanism as claimed in claim 1, wherein a size of the first drive magnetic element is different from a size of the second drive magnetic element, and a magnetic pole of the first drive magnetic element facing the second coil is different from a magnetic pole of the second drive magnetic element facing the second coil.

9. An optical element drive mechanism, comprising:
   an immovable part;
   a movable part movable relative to the immovable part, wherein the movable part holds an optical element with an optical axis; and
   a drive assembly driving the movable part to move relative to the immovable part, wherein at least part of the drive assembly is disposed on the immovable part,
   wherein the drive assembly comprises a circuit unit and a drive magnetic unit, the circuit unit comprises a first coil and a second coil, the drive magnetic unit comprises a first drive magnetic element and a second drive magnetic element, the first coil corresponds to an upper surface of the first drive magnetic element, the second coil corresponds to a side surface of the first drive magnetic element and a side surface of the second drive magnetic element, and the side surface of the first drive magnetic element is parallel with the side surface of the second drive magnetic element,
   wherein an arrangement direction of magnetic poles of the first drive magnetic element is parallel with a first direction, and the first drive magnetic element and the second drive magnetic element are arranged in a second direction,
   wherein the optical axis, the first direction, and the second direction are not parallel with each other, the first direction is perpendicular to the second direction, and a maximum size of the first drive magnetic element in the first direction is different from a maximum size of the second drive magnetic element in the first direction.

10. The optical element drive mechanism as claimed in claim 9, wherein an arrangement direction of magnetic poles of the second drive magnetic element is parallel with the first direction.

11. The optical element drive mechanism as claimed in claim 9, wherein the circuit unit further comprises a third coil, the drive magnetic unit further comprises a third drive magnetic element, the third coil corresponds to the third drive magnetic element, and the first drive magnetic element, the second drive magnetic element, and the third drive magnetic element at least partially overlap each other when viewed from the second direction.

12. The optical element drive mechanism as claimed in claim 11, wherein the first coil, the second coil, and the third coil are bar-like, a major axis of the first coil is parallel with a major axis of the second coil, and the major axis of the first coil is not parallel with a major axis of the third coil.

13. The optical element drive mechanism as claimed in claim 11, wherein a winding axis of the first coil is parallel with a winding axis of the third coil.

14. The optical element drive mechanism as claimed in claim 11, wherein the first coil, the second coil, and the third coil at least partially overlap each other when viewed from the second direction.

15. The optical element drive mechanism as claimed in claim 11, wherein the arrangement direction of the magnetic poles of the first drive magnetic element is not parallel with an arrangement direction of magnetic poles of the third drive magnetic element, or, the arrangement direction of the magnetic poles of the first drive magnetic element is perpendicular to the arrangement direction of the magnetic poles of the third drive magnetic element.

16. The optical element drive mechanism as claimed in claim 11, wherein a maximum size of the first drive magnetic element in a direction that is parallel with the optical axis is different from a maximum size of the third drive magnetic element in a direction that is parallel with the optical axis, or, the maximum size of the first drive magnetic element in a direction that is parallel with the optical axis is less than the maximum size of the third drive magnetic element in a direction that is parallel with the optical axis.

17. The optical element drive mechanism as claimed in claim 11, wherein the drive assembly further comprises a magnetically-permeable element disposed between the first drive magnetic element and the third drive magnetic element, wherein the magnetically-permeable element adjusts distribution of magnetic field.

18. The optical element drive mechanism as claimed in claim 9, wherein the drive assembly drives the movable part to move relative to the immovable part in the optical axis, the first direction, and the second direction.

19. The optical element drive mechanism as claimed in claim 9, wherein a winding axis of the first coil is not parallel with a winding axis of the second coil, and the first coil and the second coil do not overlap each other in a direction that is parallel with the winding axis of the second coil.

20. The optical element drive mechanism as claimed in claim 9, wherein a size of the first drive magnetic element is different from a size of the second drive magnetic element, and a magnetic pole of the first drive magnetic element facing the second coil is different from a magnetic pole of the second drive magnetic element facing the second coil.

* * * * *